US009605408B2

(12) United States Patent
Satake et al.

(10) Patent No.: US 9,605,408 B2
(45) Date of Patent: Mar. 28, 2017

(54) CONSTRUCTION MACHINE

(75) Inventors: Hidetoshi Satake, Ishioka (JP); Takako Satake, legal representative, Ishioka (JP); Shinji Kato, Tsukuba (JP); Shuji Egawa, Tsuchiura (JP); Takenori Hiroki, Ibaraki (JP); Toshihiko Watanabe, Ushiku (JP); Yasunori Ota, Tsuchiura (JP); Mitsugu Ojima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 746 days.

(21) Appl. No.: 14/110,255

(22) PCT Filed: May 14, 2012

(86) PCT No.: PCT/JP2012/062295
§ 371 (c)(1),
(2), (4) Date: Oct. 7, 2013

(87) PCT Pub. No.: WO2012/157606
PCT Pub. Date: Nov. 22, 2012

(65) Prior Publication Data

US 2014/0021781 A1 Jan. 23, 2014

(30) Foreign Application Priority Data

May 16, 2011 (JP) ................................ 2011-109423
May 16, 2011 (JP) ................................ 2011-109425

(51) Int. Cl.
*B60L 1/00* (2006.01)
*B60L 3/00* (2006.01)
(Continued)

(52) U.S. Cl.
CPC .......... *E02F 9/0866* (2013.01); *E02F 9/0858* (2013.01); *H01R 33/975* (2013.01); *E02F 3/3654* (2013.01); *H01R 13/6392* (2013.01)

(58) Field of Classification Search
CPC ..... E02F 9/0866; E02F 9/0858; E02F 3/3654; H01R 33/975; H01R 13/6392
(Continued)

(56) References Cited

U.S. PATENT DOCUMENTS 5,441,123 A 8/1995 Beckley
2002/0070585 A1 6/2002 Uno et al.
(Continued)

FOREIGN PATENT DOCUMENTS

EP 2 256 258 A2 12/2010
JP 03-145079 A 6/1991
(Continued)

OTHER PUBLICATIONS

European Search Report received in corresponding European Application No. 12785497 dated Dec. 1, 2014.

*Primary Examiner* — Richard Tan

(57) ABSTRACT

An electric motor that is fixed to a revolving frame, an electrical equipment that is supported by the revolving frame by using a vibration absorption mount, and a cable for establishing a connection between the electric motor and the electrical equipment are provided. A connector mounting member having an outer shape smaller than that of a box is provided in the box of the electrical equipment, and an equipment-side connector is provided in the connector mounting member. A cable-side connector of the cable is connected to the equipment-side connector, and a cable end portion of the cable is fixed to the box by a clamp member.
(Continued)

As a result, the vibration that is transmitted to the cable can be matched with the vibration that is transmitted to the cable-side connector.

11 Claims, 12 Drawing Sheets

(51) Int. Cl.

| | |
|---|---|
| ***H02G 3/00*** | (2006.01) |
| ***E02F 9/08*** | (2006.01) |
| ***H01R 33/975*** | (2006.01) |
| *E02F 3/36* | (2006.01) |
| *H01R 13/639* | (2006.01) |

(58) Field of Classification Search
USPC .................................................... 307/91, 9.1
See application file for complete search history.

(56) References Cited

U.S. PATENT DOCUMENTS

| | | | |
|---|---|---|---|
| 2007/0123105 | A1 | 5/2007 | Tsukashima et al. |
| 2010/0243321 | A1 | 9/2010 | Adachi et al. |

FOREIGN PATENT DOCUMENTS

| | | | |
|---|---|---|---|
| JP | 7-57709 | A | 3/1995 |
| JP | 2008-044408 | A | 2/2008 |
| JP | 2010-270555 | A | 2/2010 |

CONSTRUCTION MACHINE

TECHNICAL FIELD

The present invention relates to a construction machine, such as a hydraulic excavator or a wheel loader, and more particularly to a construction machine provided with an electric device, such as an electric motor for a revolving device or an electric motor for a hydraulic pump.

BACKGROUND ART

In general, a hydraulic excavator known as a typical example of a construction machine has a vehicle body that is configured of an automotive lower traveling structure, and an upper revolving structure that is rotatably mounted on the lower traveling structure through revolving wheels. A working mechanism is provided in a front portion side of the upper revolving structure to perform an excavating operation or the like.

Here, a revolving device is provided between the lower traveling structure and the upper revolving structure to revolve the upper revolving structure. A so-called hybrid type revolving device is proposed as a revolving motor forming this revolving device, which is configured to use both a hydraulic motor and an electric motor (electric device). On the other hand, a hybrid type hydraulic pump, which is driven by an engine and by an electric motor, is also proposed as a hydraulic pump that is used in a construction machine.

Incidentally, an electrical equipment that accommodates an electrical component such as an inverter circuit or an electrical equipment that accommodates an electrical component such as a capacitor is connected to the electric motor that is used in the revolving motor through a cable. Here, the inverter circuit converts a drive current that is supplied to the electric motor between a direct current and an alternate current, and the capacitor reserves electrical energy for driving the electric motor. In this case, a cable-side connector is provided in an end portion of the cable that is connected to the electric motor, and this cable-side connector is connected to an equipment-side connector that is provided in the electrical equipment. Therefore, the electrical component that is accommodated in the electrical equipment and the electric motor can be connected electrically.

Incidentally, in the hydraulic excavator, the vehicle body strongly vibrates at an excavating operation or the like. Therefore, even if the cable-side connector and the equipment-side connector as described above are connected, the vibration is transmitted from the cable to connecting terminals (contact) that are connected electrically to the cable. As a result, corrosion (fretting corrosion) is generated on contact surfaces of the connecting terminals of each other due to micro sliding, creating a possibility that defects such as contact failure or burnout occur.

On the other hand, in the hybrid type excavator, it is usually required to protect the electrical equipment, such as a controller, an electric power storage device and the like that are mounted on the vehicle body, from the vibration. Therefore, the hybrid type excavator adopts the configuration of supporting these kinds of electrical equipment to the vehicle body through vibration absorption mounts (Patent Document 1).

However, in a case where the electrical equipment is mounted to the vehicle body through the vibration absorption member for protecting the electrical equipment from the vibration, the vibration that is transmitted to the electric motor mounted directly to the vehicle body differs from the vibration that is transmitted to the electrical equipment. Therefore, an excessive external force due to a difference between the vibration of the electric motor and the vibration of the electrical equipment acts on the connecting terminal of the cable-side connecter that is provided in the cable extending from the electric motor. As a result, the contact failure tends to be easily generated between the connecting terminal of the cable-side connector and the connecting terminal of the equipment-side connector.

In contrast, there is proposed a connector configured in such a manner that a plurality of projections are provided in a connector body into which a cable is inserted, wherein the cable is securely fixed to the connector body by a frictional force that is generated between this projection and the cable. In this way, in the connector of fixing the cable to the connector body, the vibration that is transmitted to the connecting terminal through the cable can be suppressed. As a result, it is possible to reduce the contact failure between the connecting terminal of the cable-side connector and the connecting terminal of the equipment-side connector (Patent Document 2).

PRIOR ART DOCUMENTS

Patent Documents

Patent Document 1: Japanese Patent Laid-Open No. 2010-270555 A

Patent Document 2: Japanese Patent Laid-Open No. Hei 3-145079 A

SUMMARY OF THE INVENTION

However, the cable for power that is connected to the electric motor mounted on the hydraulic excavator has a large diameter and a high rigidity because a large current flows therein. Therefore, when the hydraulic excavator generates vibrations, this vibration tends to be easily transmitted to the connecting terminal of the cable-side connector through the cable. As a result, there is a problem that the defect such as the contact failure or the burnout occurs between the connecting terminal of the cable-side connector and the connecting terminal of the equipment-side connector.

On the other hand, in a case where an outer shape of the connector is large sized corresponding to a large-diameter cable in order to increase strength of the connector to the vibration, the occupied space of the connector increases. As a result, there is a problem that workability at the time of laying the cable between the electric motor and the electrical equipment is deteriorated.

In view of the foregoing problem in the conventional art, it is an object of the present invention to provide a construction machine that can establish a secure connection between a cable-side connector that is provided in a cable extending from an electric device mounted on a vehicle body and an equipment-side connector that is provided in electrical equipment supported through a vibration absorption member, and can prevent occurrence of the aforementioned defect.

(1) The present invention for solving the aforementioned problem is applied to a construction machine comprising: an automotive vehicle body; an electric device that is mounted on the vehicle body; an electrical equipment that accommodates an electrical component connected to the electric device in a box and is supported on the vehicle body by using a vibration absorption member; and a cable that establishes a connection between the electric device and the electrical equipment.

The configuration adopted by the present invention is characterized in that a connector mounting member is provided in the box of the electrical equipment to be positioned in an outer surface side thereof and to project in an outer shape smaller than the box, an equipment-side connector to which a cable-side connector provided in an end portion of the cable at a side of the electrical equipment is connected is provided in the connector mounting member, and a clamp member is provided on the outer surface of the box in the electrical equipment to be positioned near the connector mounting member for fixing the end portion of the cable at the side of the electrical equipment.

With this arrangement, in a state of mounting the equipment-side connector to the connector mounting member provided in the box of the electrical equipment and connecting the cable-side connector that is provided in the cable extending from the electric device to the equipment-side connector, the end portion of the cable at the side of the electrical equipment can be fixed to the box by using the clamp member. Therefore, since both of the end portion of the cable and the cable-side connector can be fixed to the box in the electrical equipment, the vibration that is transmitted to the cable-side connector from the electrical equipment through the equipment-side connector can be matched with the vibration that is transmitted from the electric device to the cable and the vibration that is generated in the cable.

As a result, also in a case where the vibration that is transmitted to the electric device mounted on the vehicle body differs from the vibration that is transmitted to the electrical equipment supported on the vehicle body through the vibration absorption member, it is possible to suppress an excessive external force to be transmitted to the connecting terminal of the cable-side connector. Therefore, it is possible to suppress generation of fretting corrosion due to micro sliding on contact surfaces of the connecting terminals of each other between the cable-side connector and the equipment-side connector at machine-working to prevent occurrence of the defect such as contact failure or burnout.

Further, since it is possible to suppress the excessive external force due to the vibration to be transmitted to the connecting terminal of the cable-side connector, the cable-side connector and the equipment-side connector can be downsized. As a result, the occupied space of each of these connectors can be made small to enhance the workability at the time of laying the respective cables.

(2) According to the present invention, the box of the electrical equipment is formed of a three-dimensional structure that is surrounded by a top surface, a bottom surface, and side surfaces, the box of the electrical equipment is provided on the vehicle body in a state of directing the bottom surface downward, the connector mounting member is mounted to any of outer surfaces other than the bottom surface of the box, the cable-side connector of the cable is arranged in a remaining portion other than a portion on which the connector mounting member is mounted, among any of the outer surfaces on which the connector mounting member is mounted, and the clamp member is mounted in the remaining portion among any of the outer surfaces on which the connector mounting member is mounted.

With this arrangement, the cable-side connector is only arranged in the remaining portion other than the portion on which the connector mounting member is mounted, and the cable can securely be fixed by using the clamp member that is mounted to the remaining portion.

(3) According to the present invention, the box of the electrical equipment is formed of a three-dimensional structure that is surrounded by a top surface, a bottom surface, a front surface, a rear surface, a left surface, and a right surface, the connector mounting member is formed of a three-dimensional structure that is surrounded by a top surface, a front surface, a rear surface, a left surface, and a right surface, the box of the electrical equipment is provided on the vehicle body in a state of directing the bottom surface downward, the connector mounting member is provided to any of the outer surfaces other than the bottom surface of the box, the equipment-side connector is provided on a surface perpendicular to any of the outer surface on which the connector mounting member is provided to the box among the respective surfaces of the connector mounting member, the connector mounting member is arranged to be closer to the rear surface side of the box in such a manner that a space is formed in front side of the surface on which the equipment-side connector is provided to the connector mounting member, the cable-side connector of the cable is arranged in any of the outer surface of the box to be positioned in a front side of the surface on which the equipment-side connector is provided to the connector mounting member, and the clamp member is arranged in any of the outer surface of the box to be positioned in the front side of the surface on which the equipment-side connector is provided to the connector mounting member.

With this arrangement, the space can be ensured in the front side of the surface, on which the equipment-side connector is provided, in the connector mounting member mounted to the box. Therefore, at the time of connecting the cable-side connector to the equipment-side connector of the connector mounting member, the cable-side connector can be accommodated within the installation plane of the connector mounting member. This configuration can suppress the cable-side connector that is connected to the equipment-side connector to project from the installation plane of the connector mounting member to an outside to prevent interference between the equipment arranged in the periphery of the electrical equipment and the cable-side connector.

Further, the cable-side connector can be connected to the equipment-side connector in the horizontal direction by mounting the equipment-side connector to the surface perpendicular to the installation plane of the connector mounting member among the respective surfaces of the connector mounting member. As a result, it is possible to suppress water components due to rain water, dew condensation or the like to enter into the connecting portion between the cable-side connector and the equipment-side connector through the cable, thus protecting these respective connectors.

(4) According to the present invention, a clamp fixing portion is provided on any of the outer surface, on which the connector mounting member is provided, of the box, and the clamp member is mounted to the clamp fixing portion.

With this arrangement, the end portion of the cable on which the cable-side connector is provided can be securely fixed by the clamp member that is mounted to the clamp fixing tool.

(5) According to the present invention, the box is provided with a cover for covering the equipment-side connector that is provided in the connector mounting member and the cable-side connector that is connected to the equipment-side connector.

With this arrangement, for example, at the time of performing maintenance or inspection work to the electric device or the electrical equipment, it is possible to prevent an operator from stepping on the connecting portion between the equipment-side connector and the cable-side connector by mistake. Therefore, the equipment-side connector and the cable-side connector can be protected, an inadvertent damage thereof can be prevented, and it is possible to securely connect both for a long period of time.

(6) According to the present invention, the electrical equipment is composed of a first electrical equipment that is connected to the electric device by using a first cable, and a second electrical equipment that is connected to the first electrical equipment by using a second cable, and an inverter circuit is accommodated in the box of the first electrical equipment, and a condenser for reserving electrical energy is accommodated in the box of the second electrical equipment.

With this arrangement, a secure connection between the cable-side connector that is provided in the first cable and the equipment-side connector that is provided in the first electrical equipment can be established, and a secure connection between one cable-side connector that is provided in the second cable and the equipment-side connector that is provided in the first electrical equipment and a secure connection between the other cable-side connector that is provided in the second cable and the equipment-side connector that is provided in the second electrical equipment can be established.

(7) According to the present invention, the vehicle body is provided with a frame for forming a support structure, a cab for defining an operator's room that is provided in a front portion side of the frame, a machine room that is provided in a rear portion side of the frame to accommodate a prime mover required for driving the vehicle body and to be covered with a housing cover, and an accommodation space that is provided in the housing cover together with the machine room, is closed by a floor plate and can accommodate equipment or components, and the floor plate of the accommodation space is removable from the frame, the floor plate and the electrical equipment are in advance assembled through the vibration absorption member to form a single onboard equipment assembly, and the floor plate forming the onboard equipment assembly is mounted to the frame in a position of the accommodation space.

With this arrangement, by mounting the electrical equipment to the floor plate that is configured to be removable from the frame through the vibration adsorption member, the onboard equipment assembly can be formed by using the floor plate which is originally the component member of the frame. Therefore, it is not necessary to use a basis composed of a member different from the frame, and when the floor plate forming part of the onboard equipment assembly is only mounted in the accommodation space after forming the onboard equipment assembly, the electrical equipment can be arranged in the accommodation space quickly and easily.

Further, the electrical equipment is mounted to the floor plate that is originally the component member of the frame to form the onboard equipment assembly, and thereby the onboard equipment assembly can be downsized as quickly as possible. As a result, at the time of mounting or removing the onboard equipment assembly to or from the frame in the position of the accommodation space, a large work space can be secured in the periphery of the onboard equipment assembly to enhance the workability at the time of mounting or removing the mount device to or from the frame.

In addition, by mounting the electrical equipment to the floor plate that is the component member of the frame, the number of components in the onboard equipment assembly can be eliminated as compared to a case of using the basis composed of the member different from the frame. Therefore, the assembly workability of the onboard equipment assembly can be enhanced, and besides, a manufacturing cost of the onboard equipment assembly can be reduced.

(8) According to the present invention, the accommodation space is formed as a utility room that is provided in a rear portion of the cab, is covered with a door cover which can open/close at a side portion, and is closed by the floor plate.

With this arrangement, it is possible to perform the maintenance of the electrical equipment by the opening/closing of the door cover, and it is possible to effectively use the space that is in advance prepared for accommodating the equipment in the construction machine.

(9) According to the present invention, the vibration absorption member is composed of an equipment-side mounting portion that is mounted to the electrical equipment, a floor plate-side mounting portion that is mounted to the floor plate, an elastic body that is provided between the equipment-side mounting portion and the floor plate-side mounting portion, and a bolt that is provided in the floor plate-side mounting portion to be inserted into the floor plate, and the onboard equipment assembly is formed by mounting the equipment-side mounting portion of the vibration absorption member to the bottom surface of the electrical equipment, and fastening the bolt of the vibration absorption member to the floor plate, and the floor plate of the onboard equipment assembly is mounted to the frame by using a fastening member in a state of being placed on said frame.

With this arrangement, after the floor plate of the onboard equipment assembly is once placed on the frame, the floor plate is mounted to the frame by using the fastening member, thus making it possible to mount the onboard equipment assembly to the frame. Therefore, since the mounting/removal operation of the onboard equipment assembly to/from the frame can be performed in the upper-lower direction, the workability can be furthermore improved.

(10) According to the present invention, the floor plate-side mounting portion of the vibration absorption member is provided with a rotation restricting member for suppressing the vibration absorption member to rotate to the floor plate by the engagement to the floor plate.

With this arrangement, at the time of inserting the bolt that projects on the floor plate-side mounting portion of the vibration absorption member into the floor plate for fastening, the rotation restricting member that is provided in the floor plate-side mounting portion is engaged to the floor plate, thereby making it possible to suppress the vibration absorption member to rotate to the floor plate. Therefore, even if the frame vibrates at the operating of the construction machine, it is possible to suppress the loosening of the mounting portion between the vibration absorption member and the floor plate, and the electrical equipment can be supported to the floor plate fixed to the frame in a vibration absorption state for a long period of time.

(11) According to the present invention, a rope hanging tool is mounted to the floor plate of the onboard equipment assembly to hang a rope for lifting the onboard equipment assembly.

With this arrangement, by hanging the rope to the rope hanging tool that is mounted on the floor plate, it is possible to lift the onboard equipment assembly by using this rope. Therefore, the onboard equipment assembly as a heavy load can easily be mounted or removed to or from the frame by lifting it using the rope.

MODE FOR CARRYING OUT THE INVENTION

Hereinafter, an embodiment of a construction machine according to the present invention will be in detail explained with reference to FIG. 1 to FIG. 13, by taking a case applied to a hydraulic excavator as an example. It should be noted that in the present embodiment, an electric motor that is used in a revolving device will be explained as an example of an electric device.

In the figure, designated at 1 is a hydraulic excavator as a typical example of a construction machine. A vehicle body of the hydraulic excavator 1 is configured of an automotive crawler type lower traveling structure 2 and an upper revolving structure 3 swingably mounted on the lower traveling structure 2. A working mechanism 4 is liftably provided in a front portion side of the upper revolving structure 3, and an excavating operation of earth and sand, and the like are performed by the working mechanism 4.

Figure 1:
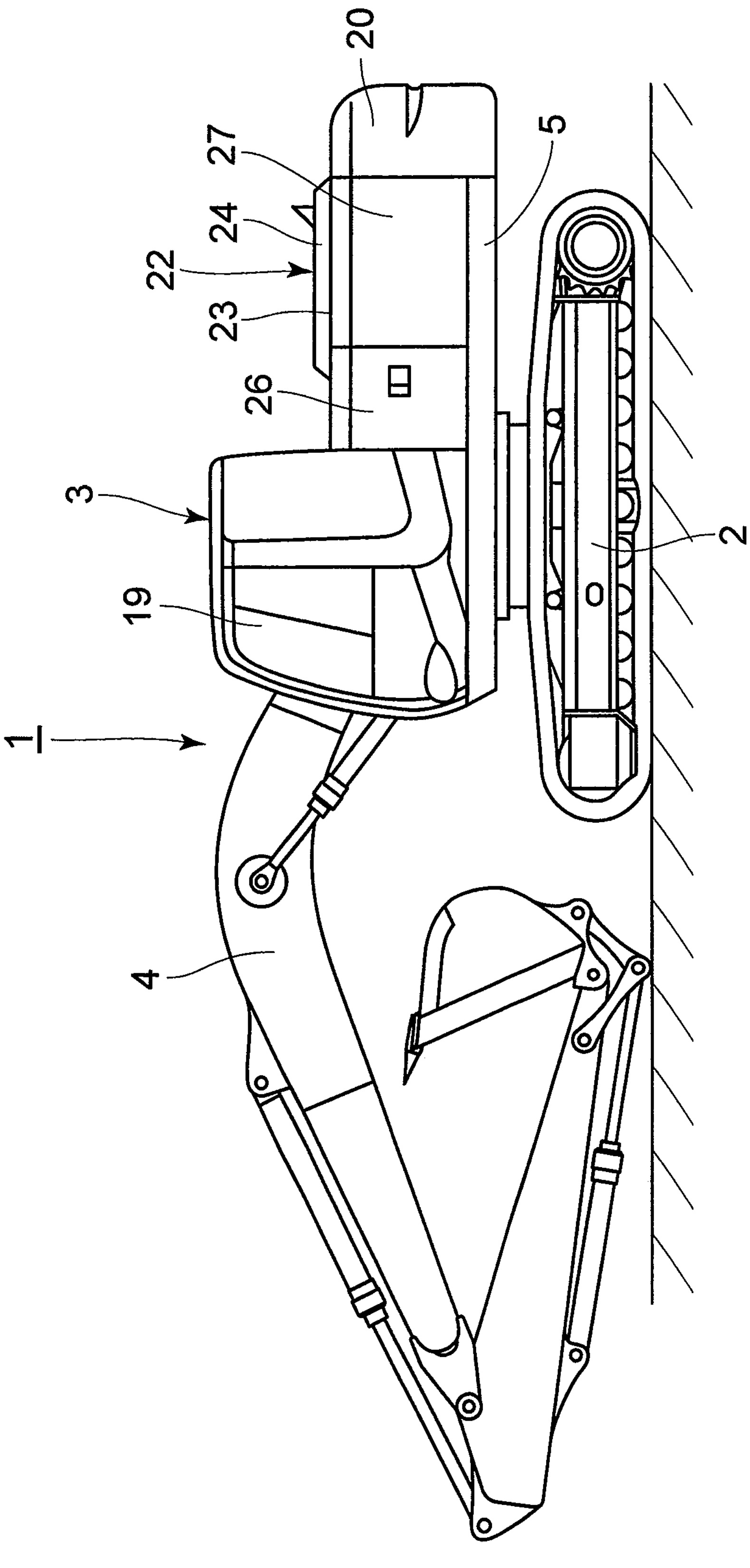
FIG. 1 is a front view showing a hydraulic excavator according to an embodiment in the present invention.
Figure 2:
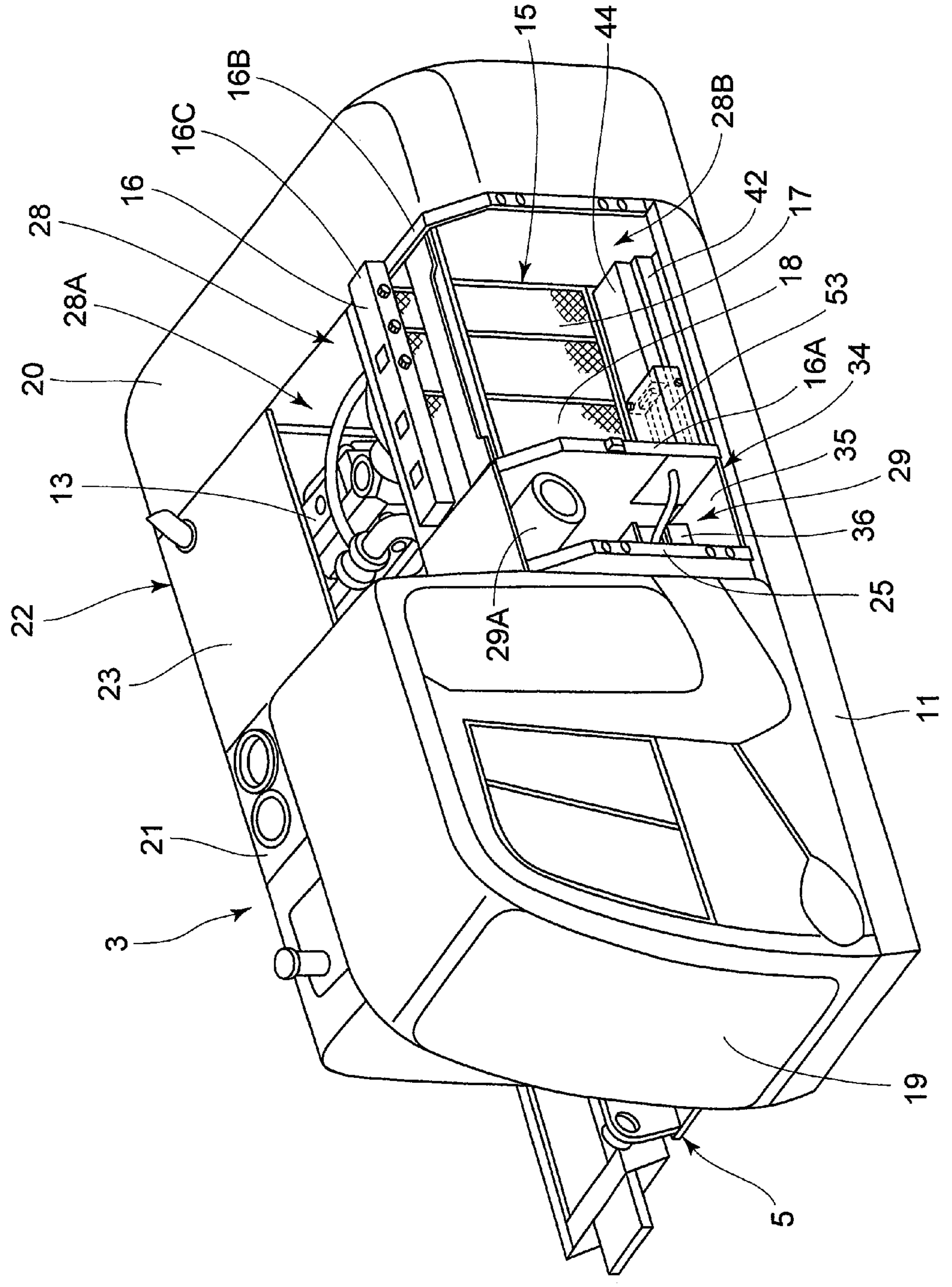
FIG. 2 is a perspective view showing an upper revolving structure in a state where a front door and a rear door are removed therefrom.
Figure 3:
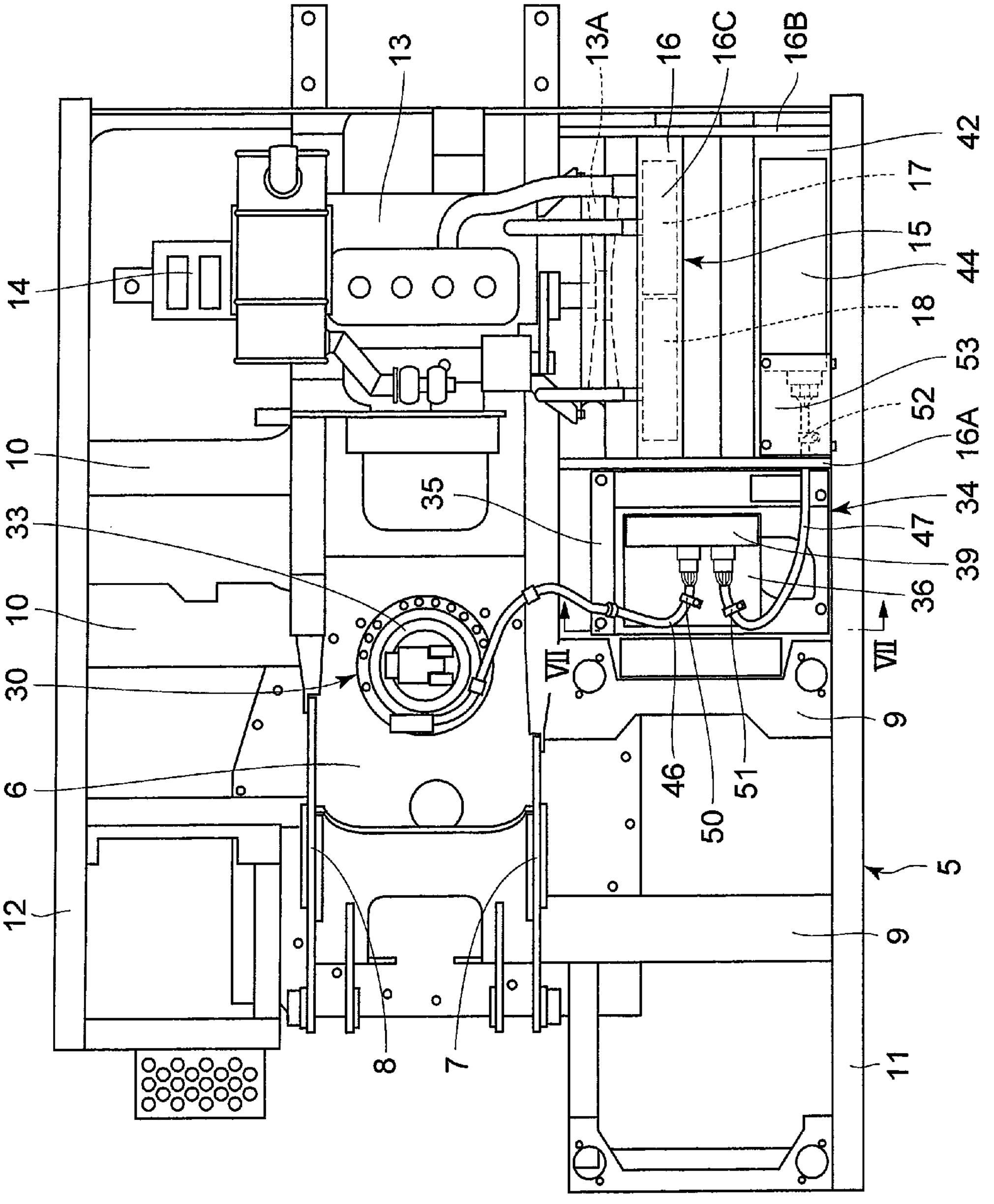
FIG. 3 is a plan view showing a state where an engine, a revolving device, first and second electrical equipment, and the like are mounted on a revolving frame.

Indicated at 5 is a revolving frame serving as a base of the upper revolving structure 3, and the revolving frame 5 is formed as a firm support structure. As shown in FIG. 3, the revolving frame 5 is largely configured of a bottom plate 6 that is formed in a thick and flat plate shape and extends in the front-rear direction, a left vertical plate 7 and a right vertical plate 8 that are installed upright on the bottom plate 6 and face to each other in the left-right direction to extend in the front-rear direction, a left extension beam 9 that is provided to extend from the left vertical plate 7 to the left side, a right extension beam 10 that is provided to extend from the right vertical plate 8 to the right side, a left side frame 11 that is fixed to a front end side of each of the left extension beams 9 and extends in the front-rear direction, and a right side frame 12 that is fixed to a front end side of each of the right extension beams 10 and extends in the front-rear direction.

A revolving device 30 to be described later is provided in an intermediate portion of the bottom plate 6 in the front-rear direction to be positioned between the left and right vertical plates 7 and 8. On the other hand, the working mechanism 4 is mounted in a front end side of the left and right vertical plates 7 and 8, and a counterweight 20 to be described later is mounted in a rear end side of the left and right vertical plates 7 and 8.

Figure 7:
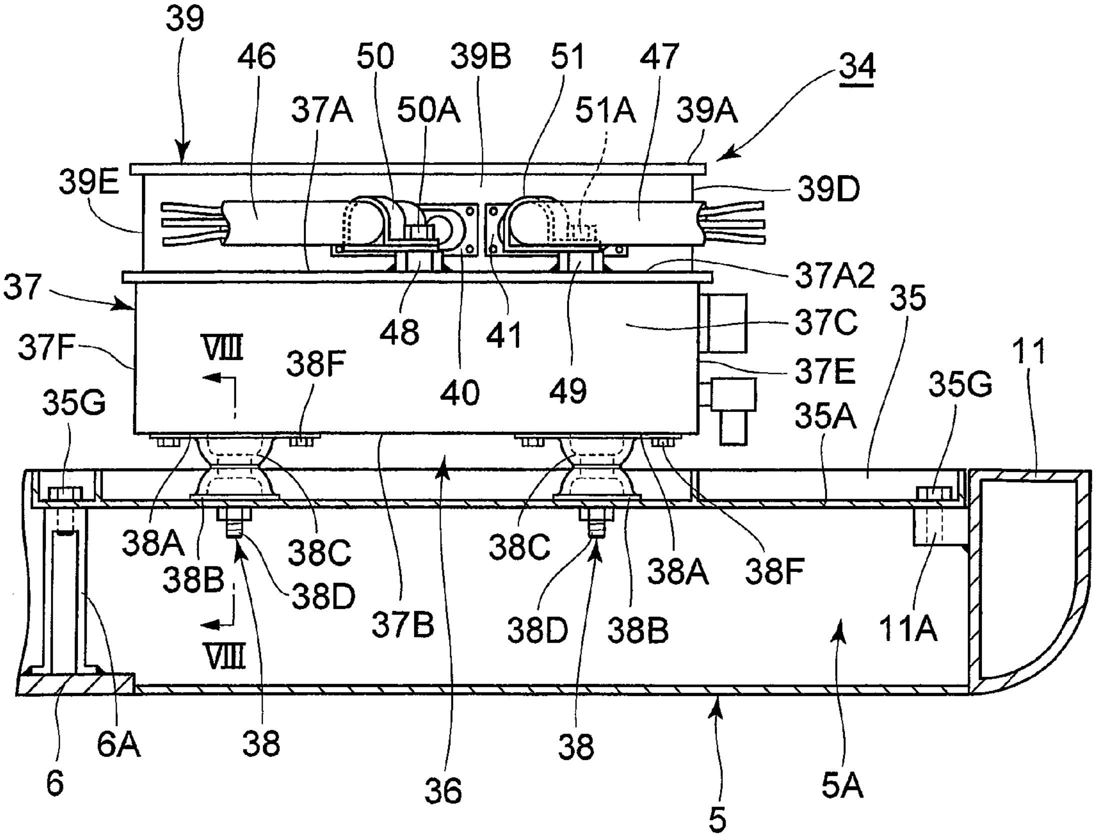
FIG. 7 is a cross section showing a mounting state of the first electrical equipment to the revolving frame as viewed in the direction of arrows VII-VII in FIG. 3.

As shown in FIG. 7 and in FIG. 12, a floor plate mounting seat 11A, to which a left end side of a floor plate 35 to be described later is mounted, is fixed to an inner side surface of the left side frame 11 by using an means of welding or the like. A floor plate mounting bracket 6A, to which a right end side of the floor plate 35 is mounted, is fixed on a top surface of the bottom plate 6 by using the means of welding or the like. In the present embodiment, the positions where these floor plate mounting seat 11A and the floor plate mounting bracket 6A are provided are formed as a position 5A of a utility room 29 (accommodation room) to be described later in the revolving frame 5.

An engine 13 as a prime mover is provided in a rear portion side of the revolving frame 5 to be positioned in front side of the counterweight 20. The engine 13 is arranged in a transversely mounted state extending in the left-right direction on the respective vertical plates 7 and 8 of the revolving frame 5. A cooling fan 13A is mounted in a left end side of the engine 13, and a hydraulic pump 14 is mounted in a right end side of the engine 13. The hydraulic pump 14 supplies pressurized oil for operation to various kinds of hydraulic actuators mounted on the hydraulic excavator 1.

A heat exchanger 15 is mounted on the revolving frame 5 to be positioned in the left side of the engine 13. This heat exchanger 15 is formed as one unit comprising a support frame 16, and a radiator 17, an oil cooler 18 and the like supported by the support frame 16, and the heat exchanger 15 is removably mounted to the revolving frame 5.

The support frame 16 of the heat exchanger 15 is composed of a front partition plate 16A facing a front partition cover 25 sandwiching the utility room 29 to be described later therebetween, a rear partition plate 16B that is provided in a front side of the counterweight 20, and a connecting plate 16C for connecting top end sides of the front partition plate 16A and the rear partition plate 16B. The support frame 16 supports the radiator 17 for cooling engine cooling water, the oil cooler 18 for cooling operating oil, and the like.

A cab 19 is provided in a front portion left side of the revolving frame 5, and the cab 19 defines an operator's room. The counterweight 20 is provided in a rear end side of the revolving frame 5, and the counterweight 20 is to maintain a weight balance with the working mechanism 4. An operating oil tank 21 is provided in a front portion right side of the revolving frame 5, and the operating oil tank 21 is to reserve operating oil that is supplied to various kinds of hydraulic actuators.

Next, the configuration of a housing cover 22, a machine room 28 formed therein, the utility room 29, and the like will be explained.

Indicated at 22 is the housing cover that is provided on the revolving frame 5 to be positioned in front side of the counterweight 20. The housing cover 22 serves to cover the engine 13, the hydraulic pump 14, the heat exchanger 15 and the like that are mounted on the revolving frame 5. Here, the housing cover 22 is configured by including a top plate 23, a bonnet 24, the support frame 16 of the heat exchanger 15, the front partition cover 25, a left front door 26, and a left rear door 27, to be described later.

The top side of the housing cover 22 is partitioned by the top plate 23 and the bonnet 24. The left side of the housing cover 22 is partitioned by the left front door 26 and the left rear door 27 and the right side of the housing cover 22 is partitioned by a right door (not shown). The front side of the housing cover 22 is partitioned by the operating oil tank 21 and the front partition cover 25, and the rear side of the housing cover 22 is partitioned by the rear partition plate 16B forming the support frame 16 of the heat exchanger 15 and the counterweight 20.

The front partition cover 25 is provided between the cab 19 and the heat exchanger 15, and the front partition cover 25 forms a part of the housing cover 22. The front partition cover 25 faces the support frame 16 (front partition plate 16A) of the heat exchanger 15 to have an interval therebetween in the front-rear direction to partition the left front side of the housing cover 22.

The left front door 26 is mounted to the front partition cover 25 to be capable of opening/closing, and the left front door 26 forms a door cover in the present invention. This left front door 26 is rotatably supported by the front partition cover 25 through a hinge member, and rotates around the center of the position of the front partition cover 25 in the front-rear direction to open/close the utility room 29 to be described later.

The left rear door 27 is provided in the rear side of the left front door 26, and the left rear door 27 is rotatably supported by the rear partition plate 16B forming the support frame 16 of the heat exchanger 15 through a hinge member. The left rear door 27 rotates around the center of the position of the rear partition plate 16B in the front-rear direction to open/close a heat exchanger front room 28B to be described later.

Indicated at 28 is the machine room that is formed within the housing cover 22. The machine room 28 is defined by the top plate 23, the bonnet 24, the left front door 26, the left rear door 27, and the right door (not shown) forming the housing cover 22, and the counterweight 20, and the operating oil tank 21. This machine room 28 is formed of an engine room 28A and the heat exchanger front room 28B that are adjacent to each other sandwiching the heat exchanger 15 therebetween.

The engine room 28A forms a space in which the engine 13, the hydraulic pump 14 and the like are accommodated, and the engine room 28A is defined by the top plate 23, the bonnet 24 and, the right door (not shown) forming the housing cover 22, the support frame 16 of the heat exchanger 15, the counterweight 20, and the operating oil tank 21.

The heat exchanger front room 28B is formed at the opposite side to the engine room 28A sandwiching the heat exchanger 15 therebetween. The heat exchanger front room 28B is defined by the top plate 23 and the left rear door 27 that form the housing cover 22, and the heat exchanger 15, and is opened/closed by the left rear door 27. In addition, a second electrical equipment 42 to be described later is provided in the heat exchanger front room 28B.

Indicated at 29 is the utility room as an accommodation room formed in the housing cover 22 together with the machine room 28. This utility room 29 is defined by the top plate 23 and the left front door 26 that form the housing cover 22, and the front partition plate 16A forming the support frame 16 of the heat exchanger 15. Here, an air cleaner 29A that purifies intake air sucked into the engine 13 is arranged in the utility room 29. In addition, a bottom side of the utility room 29 is closed by the floor plate 35 to be described later, and a first electrical equipment 36 to be described later is mounted on the floor plate 35.

Next, indicated at 30 is the revolving device that is mounted on the revolving frame 5. This revolving device 30 is installed upright in the central portion of the bottom plate 6 to be positioned between the left and right vertical plates 7 and 8 forming the revolving frame 5. Here, the revolving device 30 serves to revolve the upper revolving structure 3 supported on the lower traveling structure 2, and is configured of a hydraulic motor 31, an electric motor 33 to be described later, and a reduction gear 32. The revolving device 30 is a so-called hybrid type revolving device in which the hydraulic motor 31 and the electric motor 33 cooperate to drive and revolve the upper revolving structure 3.

Figure 4:
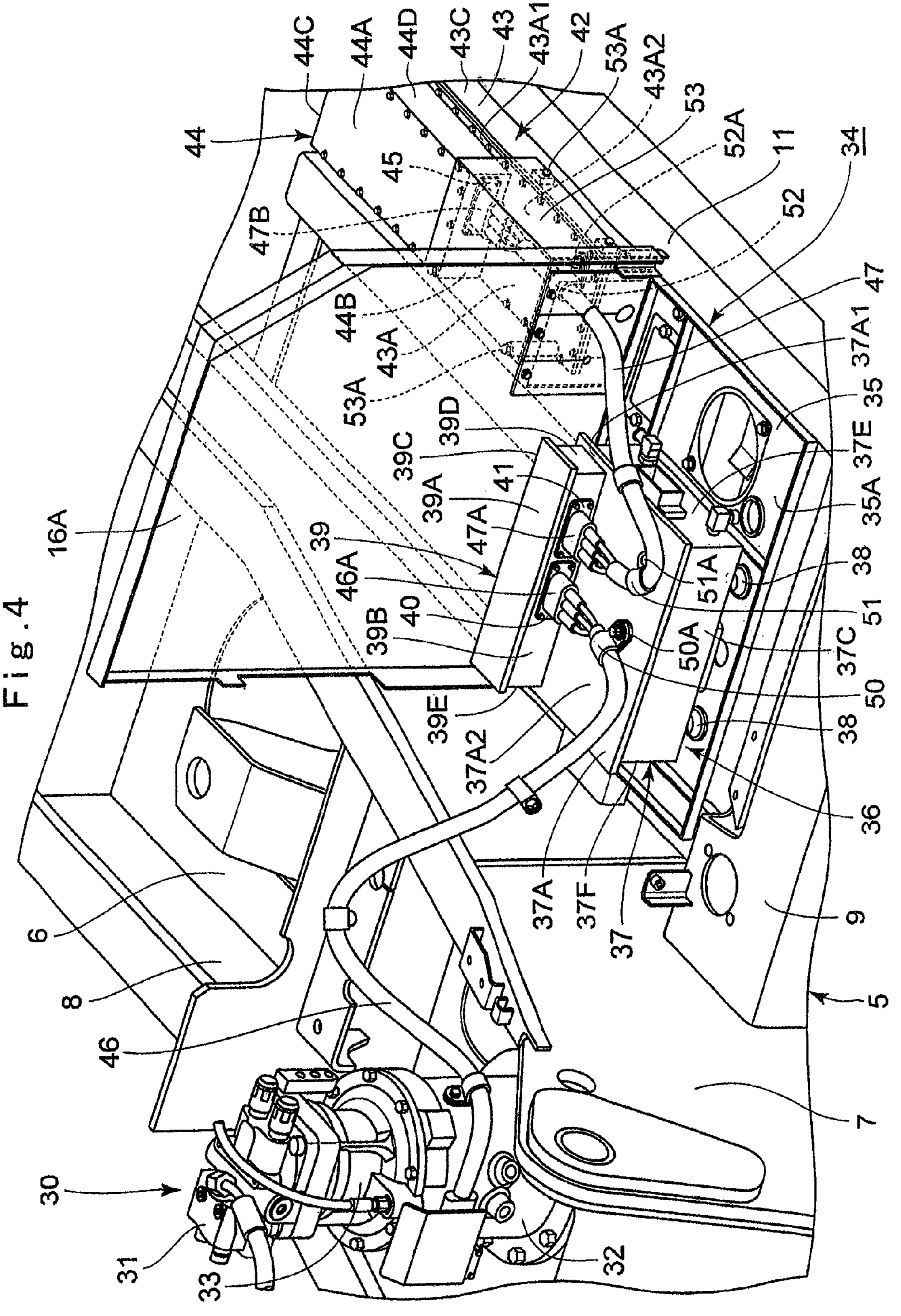
FIG. 4 is a perspective view showing a state where the revolving device, the first and second electrical equipment, and a front partition plate are mounted on the revolving frame.

Indicated at 33 is the electric motor of an alternate current type as an electric device, and the electric motor 33 forms a rotational source of the revolving device 30 together with the hydraulic motor 31. Here, as shown in FIG. 4 and in FIG. 5, the electric motor 33 is mounted to a top end portion of the reduction gear 32 forming the revolving device 30. On the other hand, the reduction gear 32 is directly mounted to the bottom plate 6 of the revolving frame 5 by using bolts and the like without interposition of the vibration absorption member and the like. In addition, the hydraulic motor 31 is mounted to a top end side of the electric motor 33.

Next, an onboard equipment assembly 34 according to the present embodiment that is arranged in the utility room 29 will be explained.

That is, indicated at 34 is the onboard equipment assembly that is arranged in the utility room 29, and the onboard equipment assembly 34 is composed of the floor plate 35, the first electrical equipment 36, and a vibration absorption mount 38 to be described later. In addition, the onboard equipment assembly 34 is formed as a single assembly (subassembly) by in advance assembling the floor plate 35 and the first electrical equipment 36 through the vibration absorption mount 38. This onboard equipment assembly 34 is mounted to the revolving frame 5 in the position of the utility room 29 shown in FIG. 2.

Figure 6:
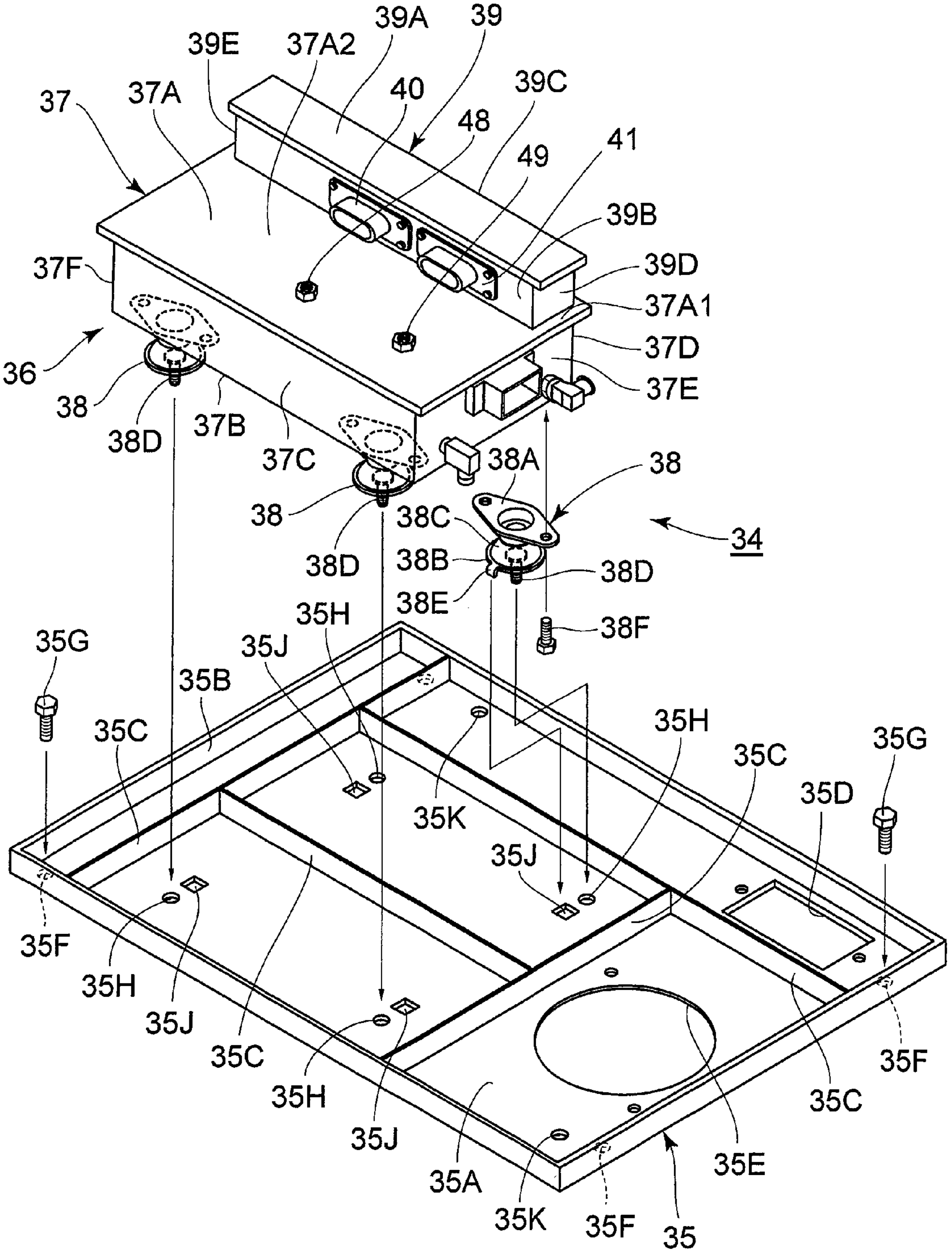
FIG. 6 is an exploded perspective view showing the first electrical equipment and a floor plate.

Indicated at 35 is the floor plate that forms a part of the revolving frame 5 and closes the bottom side of the utility room 29, and the floor plate 35 is to be a base of the onboard equipment assembly 34. As shown in FIG. 6 and in FIG. 7, the floor plate 35 is formed in a rectangular frame shape as a whole, and is removably mounted to the revolving frame 5. In addition, the first electrical equipment 36 to be described later is mounted to the floor plate 35.

Here, the floor plate 35 is configured of a mounting surface part 35A in a flat plate shape to which the first electrical equipment 36 is mounted, an outer frame part 35B that is bent upwards from an outer peripheral edge of the mounting surface part 35A, and a plurality of ribs 35C that are fixed to a top surface of the mounting surface part 35A and the outer frame part 35B to partition the mounting surface part 35A into a plurality of areas. The mounting surface part 35A is provided with a working hole 35D for attaching/removing the floor plate 35 from the revolving frame 5, a large diameter hole 35E for attach/removal of a control valve that is arranged under the floor plate 35 or for visual contact therewith, and the like. Bolt insert holes 35F are provided respectively in four corner portions of the mounting surface part 35A, and a bolt 35G as a fastening member is inserted into each of the bolt insert holes 35F. Further, by threading the bolts 35G inserted into the respective bolt insert holes 35F into the floor plate mounting seat 11A of the left side frame 11 and the floor plate mounting bracket 6A of the bottom plate 6, which are shown in FIG. 12, the floor plate 35 is removably mounted to the revolving frame 5.

On the other hand, four mount mounting holes 35H are provided in the central portion of the mounting surface part 35A to have intervals therebetween in the front-rear direction and in the left-right direction, and bolts 38D of the vibration absorption mounts 38 to be described later are inserted into each of these mount mounting holes 35H. A rotation restricting hole 35J having a small square shape is respectively provided in a portion in the vicinity of each of the mount mounting holes 35H, and a rotation restricting projection 38E of the vibration absorption mount 38 to be described later is engaged to each of these rotation restricting holes 35J. Further, two hanging bolt mounting holes 35K are formed near the corner portions of the mounting surface part 35A in positions of sandwiching the first electrical equipment 36 to be described later.

Next, designated at 36 is the first electrical equipment that is arranged in the utility room 29. The first electrical equipment 36 is supported in a vibration absorption state on the floor plate 35 through the vibration absorption mount 38 to be described later, and is connected to the electric motor 33 by using a first cable 46 to be described later. Here, the first electrical equipment 36 is provided with a box 37 to be described later, and electrical components (not shown) of an inverter circuit for converting a drive current to be supplied to the electric motor 33 from a direct current into an alternate current, a chopper circuit for pressure booster or pressure-lowering, and the like are accommodated in the box 37.

Indicated at 37 is the box forming an outer shell of the first electrical equipment 36. The box 37 is formed as a rectangular three-dimensional structure that is surrounded by a top surface 37A and a bottom surface 37B that extend in a horizontal direction, and a front surface 37C, a rear surface 37D, a left surface 37E and a right surface 37F that are substantially perpendicular to the top surface 37A. A cooling water passage (not shown) is provided inside the box 37, and the box 37 is configured such that heat which is generated from the electrical components accommodated in the box 37 is cooled by cooling water flowing in the cooling water passage. Further, a connector mounting member 39 to be described later is integrally provided on the top surface 37A of the box 37.

Indicated at 38 are a plurality of vibration absorption mounts as vibration absorption members, and each of the vibration absorption mounts 38 is provided between the box 37 forming the first electrical equipment 36 and the floor plate 35. Each of the vibration absorption mounts 38 is to suppress a large vibration of the upper revolving structure 3 to be transmitted to the first electrical equipment 36 by supporting the first electrical equipment 36 in a vibration absorption state to the revolving frame 5.

Figure 8:
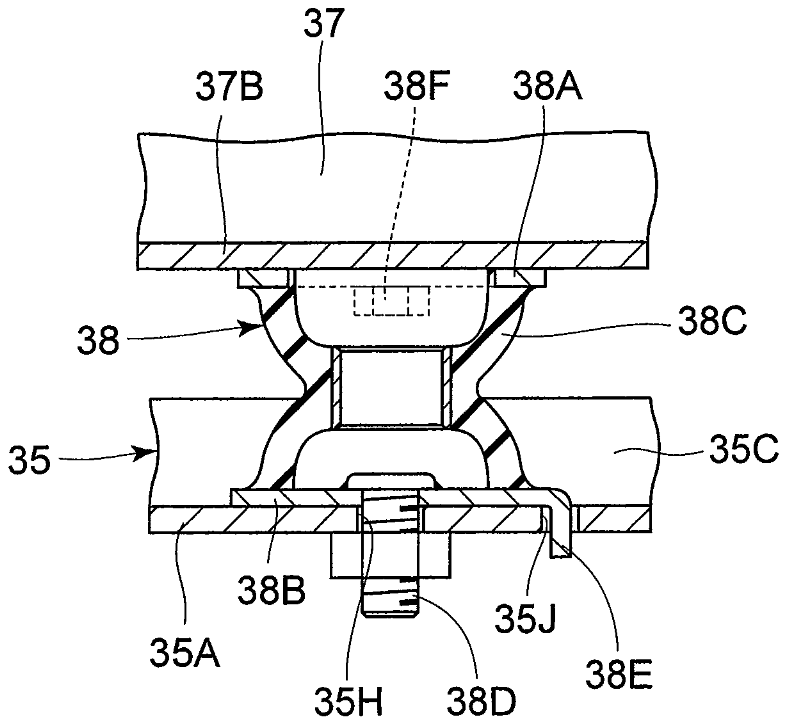
FIG. 8 is a cross section showing a vibration absorption mount as viewed in the direction of arrows VIII-VIII in FIG. 7.

Here, as shown in FIG. 6 to FIG. 8, the vibration absorption mount 38 is composed of an equipment-side mounting portion 38A in a flat plate shape that is mounted on the bottom surface 37B of the box 37, a floor plate-side mounting portion 38B in a disk shape that is mounted on the mounting surface part 35A of the floor plate 35, an elastic body 38C that is formed by using a flexible material of rubber or the like and is provided between the equipment-side mounting portion 38A and the floor plate-side mounting portion 38B, and the bolt 38D that is projected in the center portion of the floor plate-side mounting portion 38B and is inserted into the mount mounting hole 35H of the floor plate 35.

The rotation restricting projection 38E is provided in an outer peripheral edge portion of the floor plate-side mounting portion 38B, and the rotation restricting projection 38E serves as a rotation restricting member bent at a right angle along the bolt 38D from the floor plate-side mounting portion 38B. This rotation restricting projection 38E is engaged to the rotation restricting hole 35J provided in the floor plate 35 at the time of inserting the bolt 38D into the mount mounting hole 35H of the floor plate 35.

The vibration absorption mount 38 is configured such that the equipment-side mounting portion 38A is mounted to the bottom surface 37B of the box 37 by using a bolt 38F, and the bolt 38D of the vibration absorption mount 38 is inserted into the mount mounting hole 35H of the floor plate 35 for nut-fastening. As a result, the first electrical equipment 36 is mounted on the floor plate 35 through the respective vibration absorption mounts 38 to form the onboard equipment assembly 34. At this time, the rotation restricting projection 38E that is provided in the floor plate-side mounting portion 38B of the vibration absorption mount 38 is made to be engaged to the rotation restricting hole 35J that is provided in the floor plate 35. Thereby, at the time of attaching the nut to the bolt 38D for fastening, torsional forces do not act on the elastic body 38C, and therefore damages to the elastic body 38C can be prevented. Further, the rotation restricting projection 38E prevents the vibration absorption mount 38 from rotating around the bolt 38D by vibrations, therefore making it possible to improve the assembling performance and prevent the vibration absorption mount 38 from being loosened.

Next, the connector mounting member 39 that is provided in the box 37 will be explained. Here, in the present embodiment, a case where the connector mounting member 39 is provided on the top surface 37A of the box 37 is exemplified. However, the present invention is not limited thereto, and the connector mounting member 39 may be configured to be provided on any outer surface of the front surface 37C, the rear surface 37D, the left surface 37E and the right surface 37F.

Designated at 39 is the connector mounting member that is provided to project on the top surface 37A of the box 37. The connector mounting member 39 is formed as a rectangular three-dimensional structure having an outer shape having a length dimension in the front-rear direction smaller than that of the box 37. That is, the connector mounting member 39 is formed in a rectangular parallelepiped shape to be surrounded by a top surface 39A that faces the top surface 37A of the box 37 and extends in a horizontal direction, a front surface 39B, a rear surface 39C, a left surface 39D, and a right surface 39E, which are substantially perpendicular to the top surface 39A. It should be noted that the connector mounting member 39 is communicated with an inside of the box 37 through the bottom surface side formed as an opening portion, and the cable is inserted into the box 37 through the opening portion.

In this case, the connector mounting member 39 is arranged on a portion of the top surface 37A of the box 37, which is closer to the rear surface 37D side. Therefore, the front surface 39B of the connector mounting member 39 is positioned to be closer to the rear side (the rear surface 37D side) than the front surface 37C of the box 37. Therefore, the top surface 37A of the box 37 is formed of a mounting portion 37A1 on which the connector mounting member 39 is provided, and a remaining portion 37A2, which is positioned in front of the front surface 39B of the connector mounting member 39, other than the mounting portion 37A1.

Indicated at 40 and 41 are first and second equipment-side connectors that are provided to line up on the front surface 39B of the connector mounting member 39. These first and second equipment-side connectors 40 and 41 are connected to electrical components such as the inverter circuit and the like that are accommodated in the box 37. Here, a cable-side connector 46A to be described later is connected to the first equipment-side connector 40, and a cable-side connector 47A to be described later is connected to the second equipment-side connector 41.

Next, the second electrical equipment 42 that is accommodated in the heat exchanger front room 28B will be explained.

Designated at 42 is the second electrical equipment that is arranged in the heat exchanger front room 28B. The second electrical equipment 42 is connected to the first electrical equipment 36 by using a second cable 47 to be described later.

Here, the second electrical equipment 42 is configured of a box 43, and electrical components (not shown) including a condenser such as a capacitor or a battery that are accommodated in the box 43. Here, the condenser in the second electrical equipment 42 is to reserve electrical energy for driving the electric motor 33. That is, the condenser in the second electrical equipment 42 charges regenerative energy as electrical energy, which is generated by the electric motor 33 at the time of braking the electric motor 33, and discharges this electrical energy toward the electric motor 33. It should be noted that the second electrical equipment 42 is configured by connecting a plurality of condensers.

Figure 5:
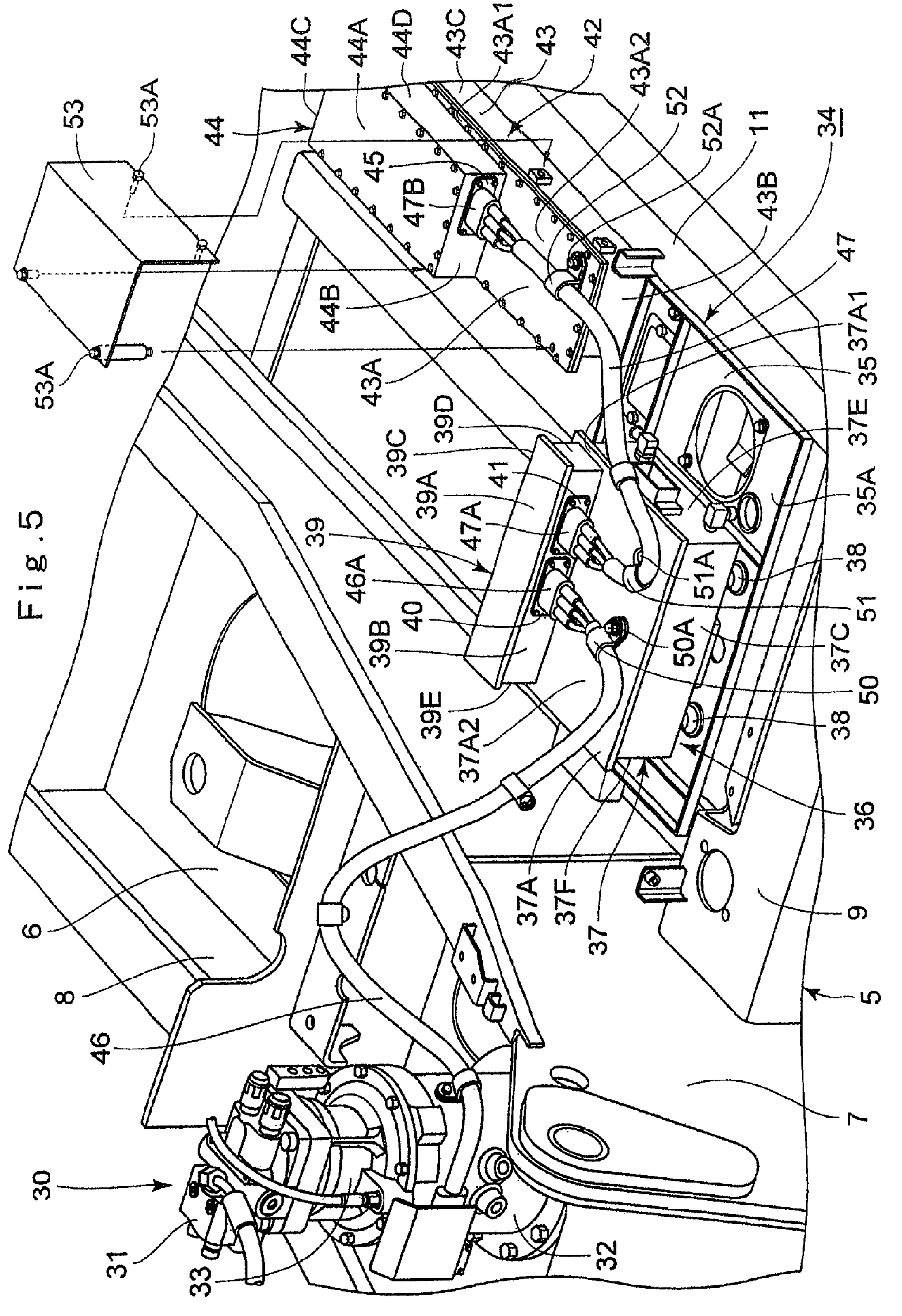
FIG. 5 is an exploded perspective view showing a state where the front partition plate is removed and a cover is removed from the second electrical equipment in FIG. 4.

On the other hand, as shown in FIG. 5, the box 43 is formed as a three-dimensional structure composed of a rectangular parallelepiped that is surrounded by a top surface 43A, a bottom surface, a front surface 43B, a rear surface, a left surface 43C and a right surface, and extends in a front-rear direction. This box 43 is, as similar to the aforementioned box 37, supported in a vibration absorption state by the revolving frame 5 through vibration absorption mounts (not shown). A cooling water passage (not shown) is provided inside the box 43, and the box 43 is configured such that heat which is generated from the electrical component accommodated in the box 43 is cooled by cooling water flowing in the cooling water passage.

Next, a connector mounting member 44 that is provided in the box 43 will be explained. Here, in the present embodiment, a case where the connector mounting member 44 is provided on the top surface 43A of the box 43 is exemplified. However, the present invention is not limited thereto, and the connector mounting member 44 may be configured to be provided on any outer surface of the front surface 43B, the rear surface, the left surface 43C and the right surface of the box 43.

Designated at 44 is the connector mounting member that is provided to project on the top surface 43A of the box 43. The connector mounting member 44 is formed as a three-dimensional structure composed of a rectangular parallelepiped that is surrounded by a top surface 44A, a front surface 44B, a rear surface 44C, a left surface 44D and a right surface, and has an outer shape having a length dimension in the front-rear direction smaller than that of the box 43. It should be noted that the connector mounting member 44 is communicated with an inside of the box 43 through the bottom surface side formed as an opening portion, and the cable is inserted into the box 43 through this opening portion.

In this case, the connector mounting member 44 is arranged on a portion of the top surface 43A of the box 43 to be closer to the rear surface. Therefore, the front surface 44B of the connector mounting member 44 is positioned to be closer to the rear side than the front surface 43B of the box 43. Therefore, the top surface 43A of the box 43 is formed of a mounting portion 43A1 on which the connector mounting member 44 is provided, and a remaining portion 43A2, which is positioned in front of the front surface 44B of the connector mounting member 44, other than the mounting portion 43A1.

Indicated at 45 is a third equipment-side connector that is provided in the front surface 44B of the connector mounting member 44. The third equipment-side connector 45 is connected to the electrical component that is accommodated in the box 43. A cable-side connector 47B to be described later is connected to the third equipment-side connector 45.

Next, designated at 46 is a first cable that establishes an electrical connection between the electric motor 33 and the first electrical equipment 36. The cable-side connector 46A in which connecting terminals (not shown) are arranged therein is provided in an end portion of the first cable 46 at a side of the first electrical equipment 36. The cable-side connector 46A of the first cable 46 is connected to the first equipment-side connector 40 that is mounted to the connector mounting member 39 of the first electrical equipment 36. In this case, the cable-side connector 46A and a portion in the vicinity of the cable-side connector 46A of the first cable 46 are accommodated in the top surface 37A (remaining portion 37A2) of the box 37 forming the first electrical equipment 36 as viewed from above.

Next, designated at 47 is a second cable that establishes an electrical connection between the first electrical equipment 36 and the second electrical equipment 42. The cable-side connectors 47A and 47B in which connecting terminals (not shown) are arranged therein are provided in both end portions of the second cable 47. The cable-side connector 47A at one end side is connected to the second equipment-side connector 41 that is mounted to the connector mounting member 39 of the first electrical equipment 36. Further, the cable-side connector 47B at the other end side is connected to the third equipment-side connector 45 that is mounted to the connector mounting member 44 of the second electrical equipment 42.

In this case, the cable-side connector 47A and a portion in the vicinity of the cable-side connector 47A of the second cable 47 are accommodated in the top surface 37A of the box 37 forming the first electrical equipment 36 as viewed from above. In addition, the cable-side connector 47B and a portion in the vicinity of the cable-side connector 47B of the second cable 47 are accommodated in the top surface 43A (remaining portion 43A2) of the box 43 forming the second electrical equipment 42 as viewed from above.

Figure 9:
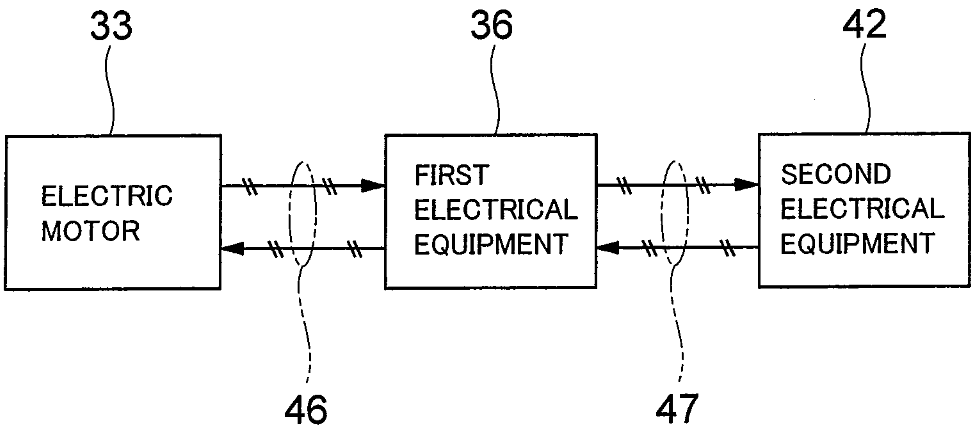
FIG. 9 is a block diagram showing a connecting relation between an electric motor used in the revolving device, and the first and second electrical equipment.

Therefore, as shown in FIG. 9, the first cable 46 establishes an electrical connection between the electric motor 33 and the first electrical equipment 36, and the second cable 47 establishes an electrical connection between the first electrical equipment 36 and the second electrical equipment 42. As a result, at the time of operating the revolving device 30, electrical energy that is discharged from the second electrical equipment 42 is supplied to the electric motor 33 as an alternate current through the first electrical equipment 36 to drive and rotate the electric motor 33. On the other hand, at the time of braking the revolving device 30, regenerative energy that is generated by inertia rotation of the electric motor 33 is reserved in the second electrical equipment 42.

Next, as shown in FIG. 6, indicated at 48 and 49 are first and second mounting seats as clamp fixing portions that are provided on the top surface 37A of the box 37 of the first electrical equipment 36. These respective mounting seats 48 and 49 are to fix first and second clamp members 50 and 51 to be described later. Here, each of the mounting seats 48 and 49 is configured of a hexagon nut, for example, and is fixed on the remaining portion 37A2 of the top surface 37A forming the box 37 by using welding means or the like. That is, each of the mounting seats 48 and 49 is provided in a portion of the box 37 of the first electrical equipment 36 in the vicinity of the connector mounting member 39 and in a front side of each of the first and second equipment-side connectors 40 and 41.

Indicated at 50 is a first clamp member that is provided in the box 37 of the first electrical equipment 36, and the first clamp member 50 is mounted to a first mounting seat 48. Here, the first clamp member 50 clamps a portion in the vicinity of the cable-side connector 46A of the first cable 46, for example, a cable end portion in which the cable-side connector 46A is provided. Therefore, the first clamp member 50 is fastened to the first mounting seat 48 that is provided on the top surface 37A of the box 37 by using a bolt 50A.

In this way, the cable-side connector 46A is connected to the connector mounting member 39 that is provided on the box 37 of the first electrical equipment 36, and an end portion of the first cable 46 is fixed to the box 37 of the first electrical equipment 36 through the first clamp member 50. Therefore, the vibration that is transmitted to the end portion of the first cable 46 can be matched with the vibration that is transmitted to the cable-side connector 46A. As a result, it is possible to suppress the excessive external force to be transmitted to the connecting terminal of the cable-side connector 46A.

Indicated at 51 is a second clamp member that is provided in the box 37 of the first electrical equipment 36, and the second clamp member 51 is mounted to a second mounting seat 49. Here, the second clamp member 51 clamps a portion in the vicinity of the cable-side connector 47A of the second cable 47, specifically a cable end portion at one side where the cable-side connector 47A is provided. Therefore, the second clamp member 51 is fastened to the second mounting seat 49 that is provided on the top surface 37A of the box 37 by using a bolt 51A.

Indicated at 52 is a third clamp member that is provided in the remaining portion 43A2 of the top surface 43A of the box 43 in the second electrical equipment 42. The third clamp member 52 is provided near the connector mounting member 44 and in front side of the third equipment-side connector 45. Here, the third clamp member 52 clamps a portion in the vicinity of the cable-side connector 47B of the second cable 47, specifically a cable end portion at the other side where the cable-side connector 47B is provided. In this state, the third clamp member 52 is fastened to the third mounting seat (not shown) that is provided on the top surface 43A of the box 43 by using a bolt 52A.

In this way, the cable-side connector 47A is connected to the connector mounting member 39 that is provided on the box 37 of the first electrical equipment 36, and the end portion of the second cable 47 at one side is fixed to the box 37 of the first electrical equipment 36 through the second clamp member 51. Therefore, the vibration that is generated in the second cable 47, the vibration that is transmitted to a part of the second cable 47 and the vibration that is transmitted to the cable-side connector 47A can be matched. On the other hand, the cable-side connector 47B is connected to the connector mounting member 44 that is provided on the box 43 of the second electrical equipment 42, and the end portion of the second cable 47 at the other side is fixed to the box 43 of the second electrical equipment 42 through the third clamp member 52. Therefore, the vibration that is generated in the second cable 47, the vibration that is transmitted to the other end portion of the second cable 47, and the vibration that is transmitted to the cable-side connector 47B can be matched.

As a result, also in a case where the vibration that is transmitted to the first electrical equipment 36 differs from the vibration that is transmitted to the second electrical equipment 42 at the machine-working, it is possible to suppress an excessive external force to be transmitted to the connecting terminal of the cable-side connector 47A or the connecting terminal of the cable-side connector 47B.

Indicated at 53 is a cover that is mounted to the box 43 of the second electrical equipment 42. The cover 53 is formed of a plate body that is bent to have an L-shaped cross section, and is fixed to the box 43 forming the second electrical equipment 42 and the connector mounting member 44 by using a plurality of bolts 53A. The cover 53 covers the third equipment-side connector 45 that is mounted to the connector mounting member 44 and the cable-side connector 47B of the second cable 47 that is connected to the third equipment-side connector 45.

Therefore, at the time of performing maintenance and inspection work to the heat exchanger 15 within the heat exchanger front room 28B, the cover 53 can prevent an operator from inadvertently stepping on the third equipment-side connector 45 or the cable-side connector 47B of the second cable 47.

Figure 12:
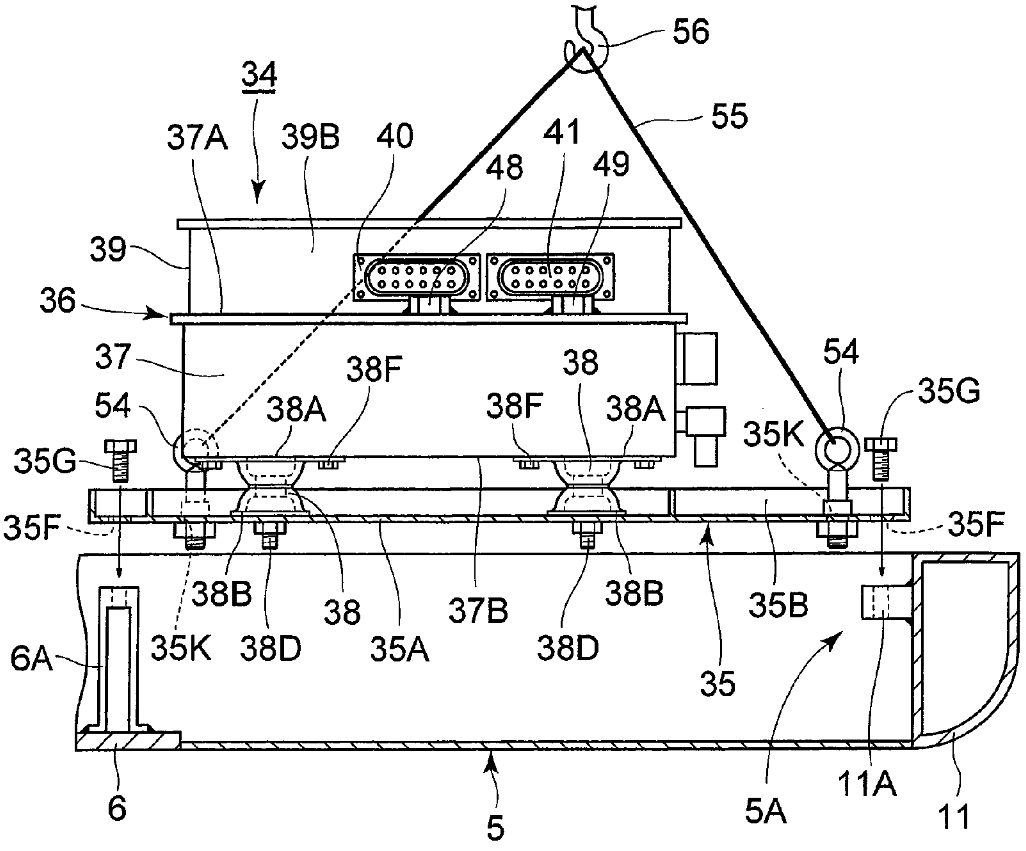
FIG. 12 is a process diagram of an assembly work showing an assembly lifting process for lifting an onboard equipment assembly using a rope.

Indicated at 54 are two hanging bolts as rope hanging tools that are mounted to the mounting surface part 35A of the floor plate 35 (refer to FIG. 12). The respective hanging bolts 54 are fastened by nuts in a state of being inserted into hanging bolt mounting holes 35K of the floor plate 35 to be fixed to two locations to sandwich the first electrical equipment 36 therebetween. Here, a rope 55 for hanging work is hung to each hanging bolt 54, and by lifting the rope 55 with a crane 56, the onboard equipment assembly 34 in which the floor plate 35, the first electrical equipment 36, and the vibration absorption mount 38 are united can be lifted. It should be noted that the hanging bolt 54 may be provided in three or more locations according to the weight balance of the onboard equipment assembly 34.

The hydraulic excavator 1 according to the present embodiment has the configuration as described above and the hydraulic excavator 1 self-travels to a work site by the lower traveling structure 2, revolves the upper revolving structure 3 by the revolving device 30, while performing an excavating operation of earth and sand by using the working mechanism 4.

In this case, the revolving frame 5 largely vibrates at the operating of the hydraulic excavator 1. Therefore, the revolving device 30 that is mounted directly to this revolving frame 5 also largely vibrates together with the revolving frame 5.

On the other hand, the first electrical equipment 36 that is arranged in the utility room 29 is supported to the floor plate 35 for closing the lower side of the utility room 29 through the vibration absorption mount 38. Therefore, the vibration that is transmitted to the first electrical equipment 36 is smaller than the vibration that is transmitted to the revolving device 30. Similarly, the second electrical equipment 42 that is arranged in the heat exchanger front room 28B is also supported to the revolving frame 5 through the vibration absorption mount (not shown). Therefore, the vibration that is transmitted to the second electrical equipment 42 is smaller than the vibration that is transmitted to the revolving device 30. In this way, at the operating of the hydraulic excavator 1, the vibration that is transmitted to the revolving device 30 differs from the vibration that is transmitted to each of the first electrical equipment 36 and the second electrical equipment 42 with each other.

In contrast, in the present embodiment, the connector mounting member 39 is provided to project on the top surface 37A of the box 37 forming the first electrical equipment 36, and the first equipment-side connector 40 and the second equipment-side connector 41 are provided on the front surface 39A of the connector mounting member 39. Similarly, the connector mounting member 44 is projected on the top surface 43A of the box 43 forming the second electrical equipment 42, and the third equipment-side connector 45 is provided on the front surface 44A of the connector mounting member 44.

In addition, at the time of establishing a connection between the electric motor 33 of the revolving device 30 and the first electrical equipment 36 by using the first cable 46, the cable-side connector 46A that is provided in the first cable 46 is connected to the first equipment-side connector 40. Together with it, the cable end portion of the first cable 46 to which the cable-side connector 46A is provided is fixed by the first clamp member 50 that is arranged on the top surface 37A of the box 37.

Thereby, both of the cable end portion of the first cable 46 to which the cable-side connector 46A is provided and the cable-side connector 46A can be fixed to the box 37 in the first electrical equipment 36. Therefore, the vibration that is transmitted to the first cable 46 can be matched with the vibration that is transmitted to the cable-side connector 46A. Accordingly, also in a case where the vibration that is transmitted to the electric motor 33 differs from the vibration that is transmitted to the first electrical equipment 36, it is possible to suppress an excessive external force to be transmitted to the connecting terminal of the cable-side connector 46A. As a result, it is possible to suppress micro sliding generating on contact surfaces of the connecting terminals of each other between the cable-side connector 46A and the first equipment-side connector 40 and it is possible to prevent occurrence of defects such as corrosion (fretting corrosion), contact failure or burnout due to the micro sliding. Therefore, the connection between the electric motor 33 and the first electrical equipment 36 can stably be established by using the first cable 46.

On the other hand, at the time of establishing a connection between the first electrical equipment 36 and the second electrical equipment 42 by using the second cable 47, the cable-side connector 47A that is provided in one end portion of the second cable 47 is connected to the second equipment-side connector 41 that is provided in the connector mounting member 39. Together with it, one end portion of the second cable 47 is fixed by the second clamp member 51 that is arranged on the top surface 37A of the box 37. Further, the cable-side connector 47B that is provided in the other end portion of the second cable 47 is connected to the third equipment-side connector 45 that is provided in the connector mounting member 44. Together with it, the other end portion of the second cable 47 is fixed by the third clamp member 52 that is arranged on the top surface 43A of the box 43.

Thereby, both of the cable end portion at one side of the second cable 47 to which the cable-side connector 47A is provided and the cable-side connector 47A can be fixed to the box 37 in the first electrical equipment 36, and the vibration that is transmitted to the second cable 47 can be matched with the vibration that is transmitted to the cable-side connector 47A. Further, both of the cable end portion at the other side of the second cable 47 to which the cable-side connector 47B is provided and the cable-side connector 47B can be fixed to the box 43 in the second electrical equipment 42. Accordingly, the vibration that is transmitted to the second cable 47 can be matched with the vibration that is transmitted to the cable-side connector 47B.

Accordingly, according to the present embodiment, also in a case where the vibration that is transmitted to the first electrical equipment 36 differs from the vibration that is transmitted to the second electrical equipment 42, it is possible to suppress an excessive external force to be transmitted to the connecting terminals of the cable-side connectors 47A and 47B provided in the second cable 47. As a result, it is possible to suppress micro sliding generating on contact surfaces of the connecting terminals of each other between the cable-side connector 47A and the second equipment-side connector 41 and between the cable-side connector 47B and the third equipment-side connector 45, and it is possible to prevent occurrence of defects such as corrosion (fretting corrosion), contact failure or burnout. Therefore, the connection between the first electrical equipment 36 and the second electrical equipment 42 can stably be established by using the second cable 47.

On the other hand, according to the present embodiment, since it is possible to suppress an excessive external force to be transmitted to the connecting terminal of the cable-side connector 46A that is provided in the first cable 46, the cable-side connector 46A and the first equipment-side connector 40 can be downsized. Similarly, since it is possible to suppress an excessive external force to be transmitted to the connecting terminals of the cable-side connectors 47A and 47B that are provided in the second cable 47, the cable-side connectors 47A and 47B, and the second and third equipment-side connectors 41 and 45 can be downsized.

As a result, these occupied space of the cable-side connectors 46A, 47A and 47B, and the first, second and third equipment-side connectors 40, 41 and 45 can be made small. Therefore, the workability at the time of arranging the first and second cables 46 and 47 between the electric motor 33 and the first electrical equipment 36, and between the first electrical equipment 36 and the second electrical equipment 42 can be improved.

According to the present embodiment, the front surface 39B of the connector mounting member 39 that is provided in the box 37 of the first electrical equipment 36 is positioned to be closer to the rear surface 37D side than the front surface 37C of the box 37. Therefore, the cable-side connector 46A of the first cable 46 that is connected to the first equipment-side connector 40, and the cable-side connector 47A of the second cable 47 that is connected to the second equipment-side connector 41 can be accommodated in the remaining portion 37A2 (front side of the equipment-side connectors 40 and 41) of the top surface 37A of the box 37 other than the mounting portion 37A1 of the connector mounting member 39. On the other hand, the front surface 44B of the connector mounting member 44 that is provided in the box 43 of the second electrical equipment 42 is positioned to be closer to the rear surface side than the front surface 43B of the box 43. Therefore, the cable-side connector 47B of the second cable 47 that is connected to the third equipment-side connector 45 can be accommodated in the remaining portion 43A2 (front side of the equipment-side connector 45) of the top surface 43A of the box 43 other than the mounting portion 43A1 of the connector mounting member 44.

Therefore, it is possible to suppress the cable-side connector 46A of the first cable 46 and the cable-side connector 47A of the second cable 47 to project from the top surface 37A of the box 37 to an outside. On the other hand, in regard to the cable-side connector 47B of the second cable 47, it is possible to suppress the cable-side connector 47B to project from the top surface 43A of the box 43 to an outside. As a result, interference of the respective cable-side connectors 46A, 47A and 47B with equipments arranged in the periphery of the first and second electrical equipments 36 and 42 can securely be prevented.

According to the present embodiment, the connector mounting member 39 of the first electrical equipment 36 is formed as a rectangular three-dimensional structure, and the first and second equipment-side connectors 40 and 41 are mounted to the front surface 39B of the connector mounting member 39. Therefore, the cable-side connector 46A of the first cable 46 can be connected to the first equipment-side connector 40 in a horizontal direction. Similarly, the cable-side connector 47A of the second cable 47 can be connected to the second equipment-side connector 41 in a horizontal direction. On the other hand, the connector mounting member 44 of the second electrical equipment 42 is formed as a rectangular three-dimensional structure to mount the third equipment-side connector 45 to the front surface 44B of the connector mounting member 44. Therefore, the cable-side connector 47B of the second cable 47 can be connected to the third equipment-side connector 45 in a horizontal direction.

As a result, even if water components due to rain water, dew condensation or the like are attached to the first and second cables 46 and 47, it can be suppressed that the water component is sucked into the cable-side connector 46A along the first cable 46 by a difference in atmospheric pressure between an inside and an outside thereof caused by a temperature change. As a result, the water component in an outside air can be prevented from entering into the connecting portion between the cable-side connector 46A and the first equipment-side connector 40. Similarly, the water component in an outside air can be prevented from entering into the connecting portion between the cable-side connector 47A and the second equipment-side connector 41 and the connecting portion between the cable-side connector 47B and the third equipment-side connector 45 along the second cable 47.

Further, by mounting the cover 53 to the box 43 forming the second electrical equipment 42, the third equipment-side connector 45 and the cable-side connector 47B of the second cable 47 that is connected to the third equipment-side connector 45 can be covered with the cover 53. As a result, at the time of performing maintenance and inspection work to the heat exchanger 15 in the heat exchanger front room 28B, it is possible to prevent an operator from inadvertently stepping on the third equipment-side connector 45 or the cable-side connector 47B of the second cable 47, which can be protected.

On the other hand, in the present embodiment, the onboard equipment assembly 34 that is configured of the floor plate 35 for closing the bottom side of the utility room 29, the first electrical equipment 36 for which the vibration absorption measure is necessary, and the vibration absorption mount 38 is in advance assembled. Thereby, the workability at the time of arranging the first electrical equipment 36 in the utility room 29 can be enhanced.

Therefore, the process of an assembly work for assembling the onboard equipment assembly 34, which will be incorporated to the revolving frame 5, will be explained with reference to FIG. 10 to FIG. 13.

Figure 10:
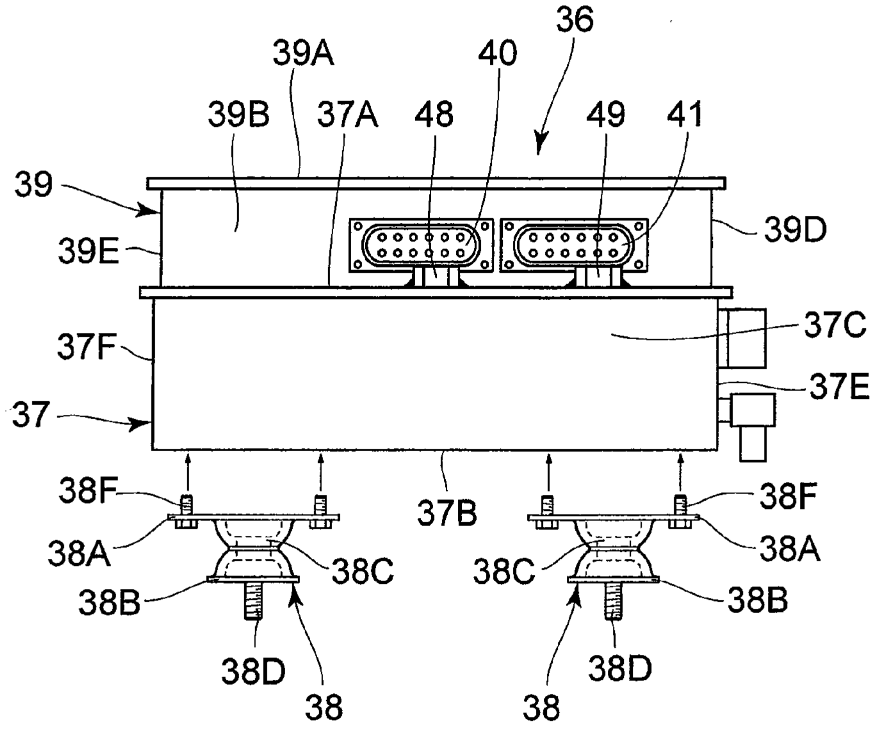
FIG. 10 is a process diagram of an assembly work showing a vibration absorption mount mounting process for mounting a vibration absorption mount to the first electrical equipment.

FIG. 10 shows a vibration absorption mount mounting process. In the vibration absorption mount mounting process, four vibration absorption mounts 38 (only two are illustrated) are mounted to the bottom surface 37B of the box 37 forming the first electrical equipment 36. In this case, the bolt 38F is inserted into the equipment-side mounting portion 38A of the vibration absorption mount 38, and the bolt 38F is threaded into the bottom surface 37B of the box 37. As a result, as shown in FIG. 11, the vibration absorption mount 38 can be mounted in a state where the floor plate-side mounting portion 38B projects downwards.

Figure 11:
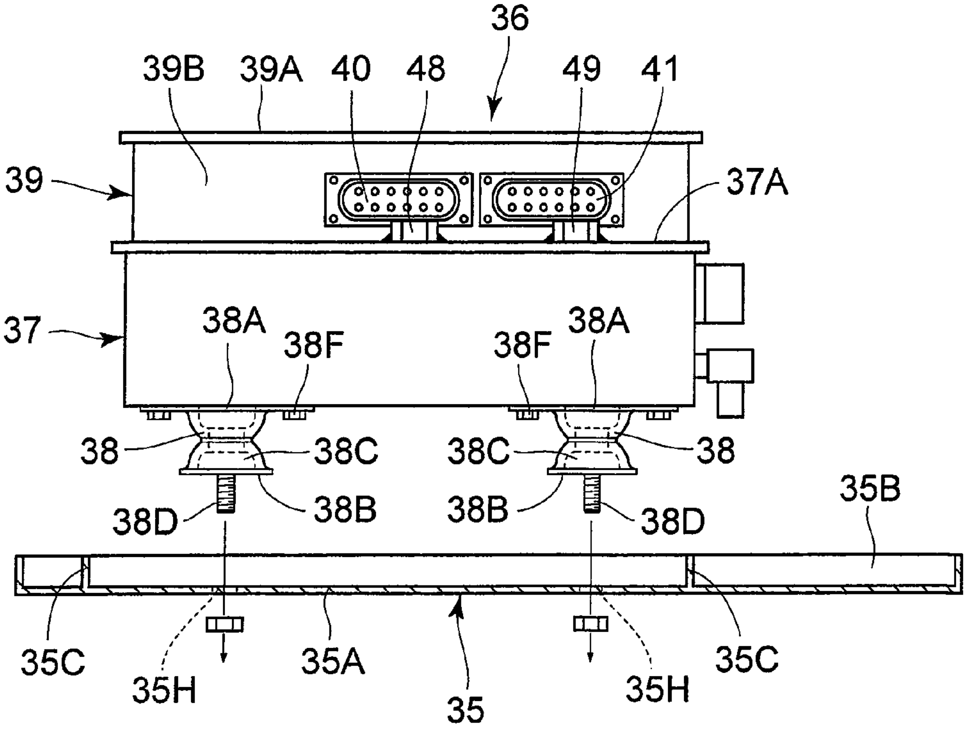
FIG. 11 is a process diagram of an assembly work showing a floor plate-side mounting process for mounting the floor plate to the vibration absorption mount.

Next, FIG. 11 shows a floor plate mounting process. In the floor plate mounting process, the bolt 38D of each vibration absorption mount 38 that is fixed in the box 37 is inserted into each mount mounting hole 35H of the floor plate 35 for nut-fastening to mount the floor plate 35 to the floor plate-side mounting portion 38B of each vibration absorption mount 38. Thereby, the first electrical equipment 36 can be mounted on the mounting surface part 35A of the floor plate 35 through the four vibration absorption mounts 38 in a vibration absorption state. As a result, as shown in FIG. 12, the onboard equipment assembly 34 comprising the floor plate 35, the first electrical equipment 36 and the vibration absorption mount 38 can be formed.

At this time, as shown in FIG. 8, the rotation restricting projection 38E that is provided in the floor plate-side mounting portion 38B of the vibration absorption mount 38 is engaged to the rotation restricting hole 35J that is provided in the floor plate 35. Thereby, at the time of attaching the nut to the bolt 38D for fastening, the torsional force does not act on the elastic body 38C, and damages to the elastic body 38C can be prevented. Further, the vibration absorption mount 38 prevents from rotating around the bolt 38D by vibrations, therefore making it possible to prevent the vibration absorption mount 38 from being loosened.

Next, FIG. 12 shows an assembly lifting process. In the assembly lifting process, the onboard equipment assembly 34 is lifted by using the rope 55 and the crane 56. In this case, two hanging bolts 54 are fixed on the top surface side of the mounting surface part 35A of the floor plate 35 in a position of sandwiching the first electrical equipment 36 in the left-right direction. The rope 55 for hanging work is hung to each of these hanging bolts 54, and by lifting the rope 55 with the crane 56, the onboard equipment assembly 34 is lifted. The lifted onboard equipment assembly 34 is carried to a position 5A of the utility room 29 of the revolving frame 5, that is, the upward side of a position including the floor plate mounting seat 11A of the left side frame 11 and the floor plate mounting bracket 6A of the bottom plate 6.

Figure 13:
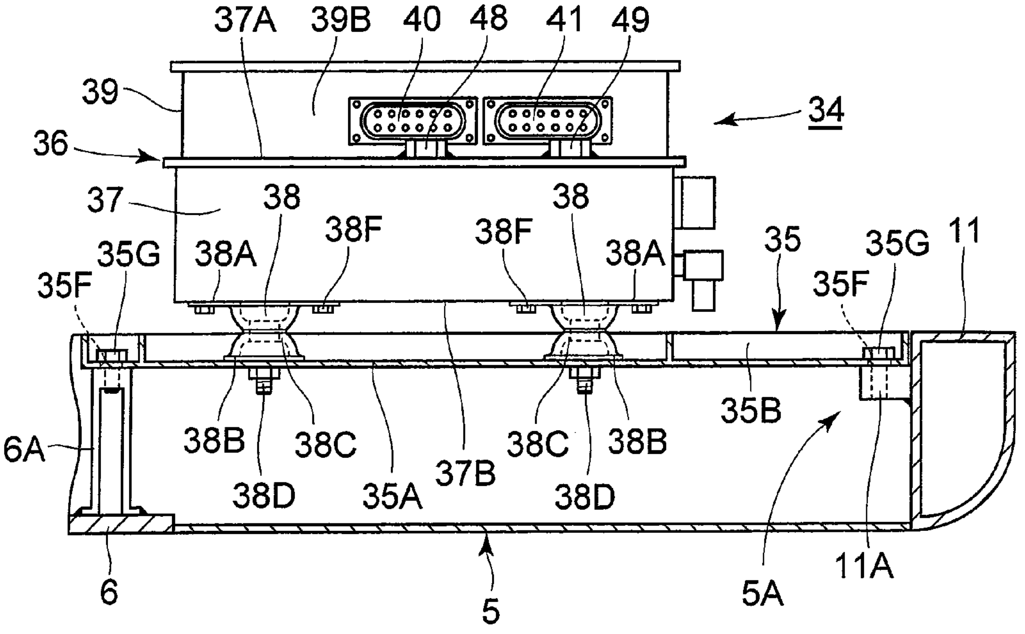
FIG. 13 is a process diagram of an assembly work showing an assembly mounting process for mounting the onboard equipment assembly to the revolving frame.

Next, FIG. 13 shows an assembly mounting process. In the assembly mounting process, first, the floor plate 35 of the onboard equipment assembly 34 is lifted by the rope 55 and the crane 56. Next, this floor plate 35 is placed on the floor plate mounting seat 11A of the left side frame 11 and the floor plate mounting bracket 6A of the bottom plate 6. In this state, the bolt 35G is inserted into each bolt insert hole 35F that is provided in the floor plate 35, and is threaded into the floor plate mounting seat 11A of the left side frame 11 and the floor plate mounting bracket 6A of the bottom plate 6. Therefore, the floor plate 35 can be fixed to the revolving frame 5, and the onboard equipment assembly 34 can be mounted in the revolving frame 5 in the position 5A of the utility room 29.

It should be noted that this assembly mounting process is executed before mounting the top surface cover for closing the top surface of the utility room 29 or by in advance removing the top surface cover before executing this process.

Thus, according to the present embodiment, the first electrical equipment 36 is mounted on the floor plate 35 configured removably to the revolving frame 5 through the vibration absorption mount 38. Thereby, the onboard equipment assembly 34 can be formed by using the floor plate 35 that is originally the component member of the revolving frame 5. Therefore, only by mounting the floor plate 35 that is a base of the onboard equipment assembly 34 to the position 5A of the utility room 29 in the revolving frame 5 after forming the onboard equipment assembly 34, the first electrical equipment 36 can quickly and easily be arranged in the utility room 29 in a vibration absorption state.

In this case, the first electrical equipment 36 is mounted to the floor plate 35 that is originally the component member of the revolving frame 5 to form the onboard equipment assembly 34, and thereby this onboard equipment assembly 34 can be downsized as quickly as possible. As a result, at the time of mounting or removing the onboard equipment assembly 34 to or from the revolving frame 5 in the position 5A of the utility room 29, a large work space in the periphery of the onboard equipment assembly 34 can be ensured, thus the workability at the mounting and removal of the onboard equipment assembly 34 can be enhanced.

Further, by mounting the first electrical equipment 36 on the floor plate 35 that is the component member of the revolving frame 5, the number of components of the onboard equipment assembly 34 can be reduced as compared to a case of using the basis composed of a member different from the revolving frame 5. As a result, the assembly workability of the onboard equipment assembly 34 can be enhanced, and besides, manufacturing costs of the onboard equipment assembly 34 can be reduced.

On the other hand, at the time of mounting the onboard equipment assembly 34 on the revolving frame 5, the floor plate 35 of the onboard equipment assembly 34 is once placed on the floor plate mounting seat 11A of the left side frame 11 and the floor plate mounting bracket 6A of the bottom plate 6. After that, the floor plate 35 can be mounted on these floor plate mounting seat 11A and the floor plate mounting bracket 6A by using the bolt 35G. Therefore, the mounting or removal work of the onboard equipment assembly 34 to or from the revolving frame 5 can be performed in the upper-lower direction in a state of lifting the onboard equipment assembly 34 by using the rope 55 to furthermore enhance the workability.

Further, at the time of inserting the bolt 38D that is provided to project from the floor plate-side mounting portion 38B of the vibration absorption mount 38 into the mount mounting hole 35H of the floor plate 35 for nut-fastening, the rotation restricting projection 38E that is provided in the floor plate-side mounting portion 38B is engaged to the rotation restricting hole 35J of the floor plate 35, making it possible to suppress the vibration absorption mount 38 to rotate to the floor plate 35. Therefore, it is possible to suppress the torsional force to act on the elastic body 38C to prevent damages of the elastic body 38C. In addition, even if the revolving frame 5 vibrates at the operating of the hydraulic excavator 1, it is possible to suppress the mount portion between the vibration absorption mount 38 and the floor plate 35 to be loosened. As a result, the first electrical equipment 36 can be supported on the floor plate 35 that is fixed to the revolving frame 5 in a stable vibration absorption state for a long period of time.

It should be noted that the aforementioned embodiment exemplifies a case where the cover 53 is provided in the box 43 forming the second electrical equipment 42 to cover the cable-side connector 47B of the second cable 47 and the third equipment-side connector 45.

Figure 14:
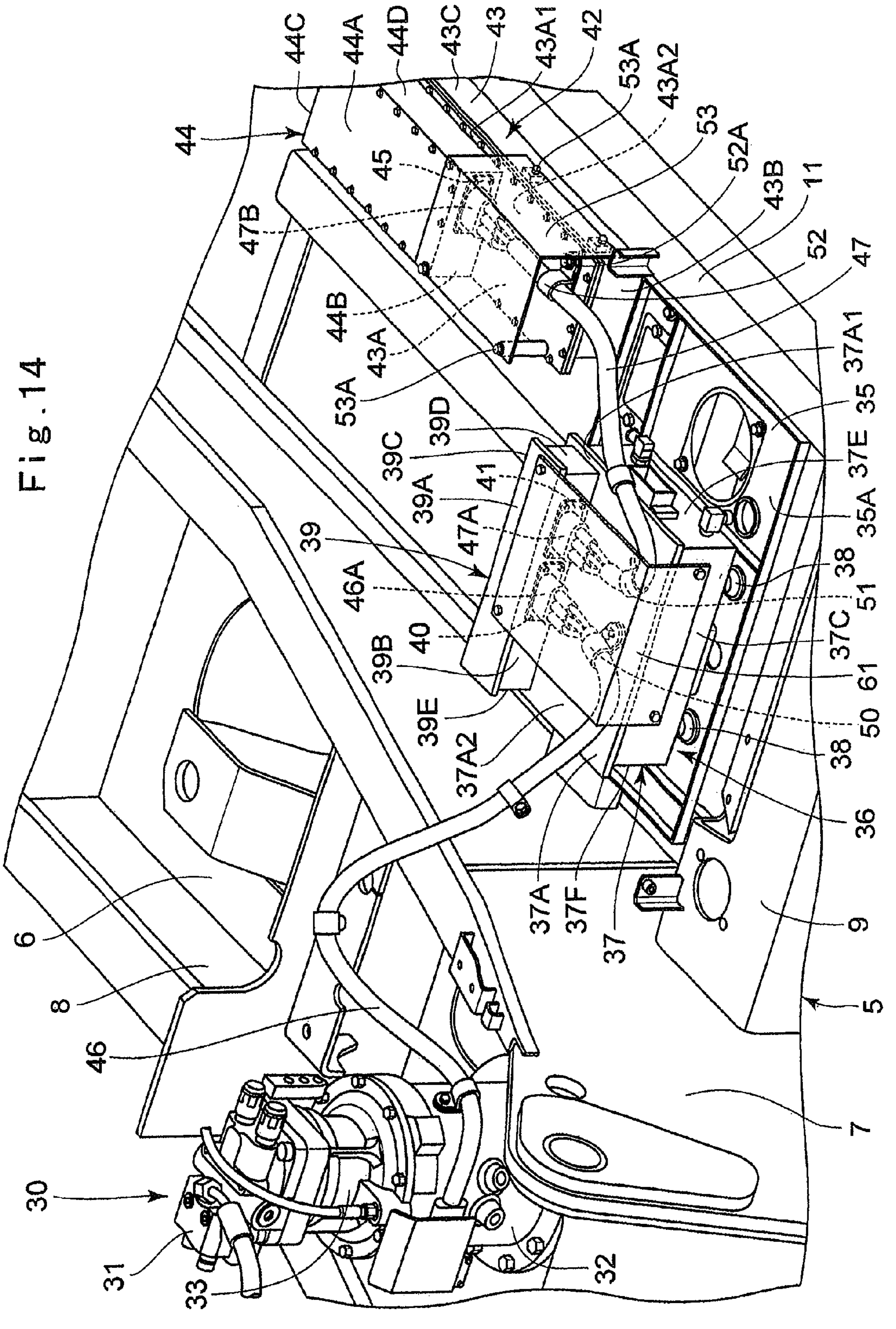
FIG. 14 is a perspective view showing a first modification in the present invention as similar to FIG. 5.

However, the present invention is not limited thereto, and the present invention may be configured as a first modification as shown in FIG. 14, for example. That is, the first modification may be configured such that a cover 61 is provided in the box 37 forming the first electrical equipment 36, and the cable-side connector 46A of the first cable 46, the cable-side connector 47A of the second cable 47, and the first and second equipment-side connectors 40 and 41 are covered with the cover 61.

The aforementioned embodiment exemplifies a case where the first and second mounting seats 48 and 49 composed of the hexagon nuts as the clamp fixing portions are mounted on the top surface 37A of the box 37 forming the first electrical equipment 36.

Figure 15:
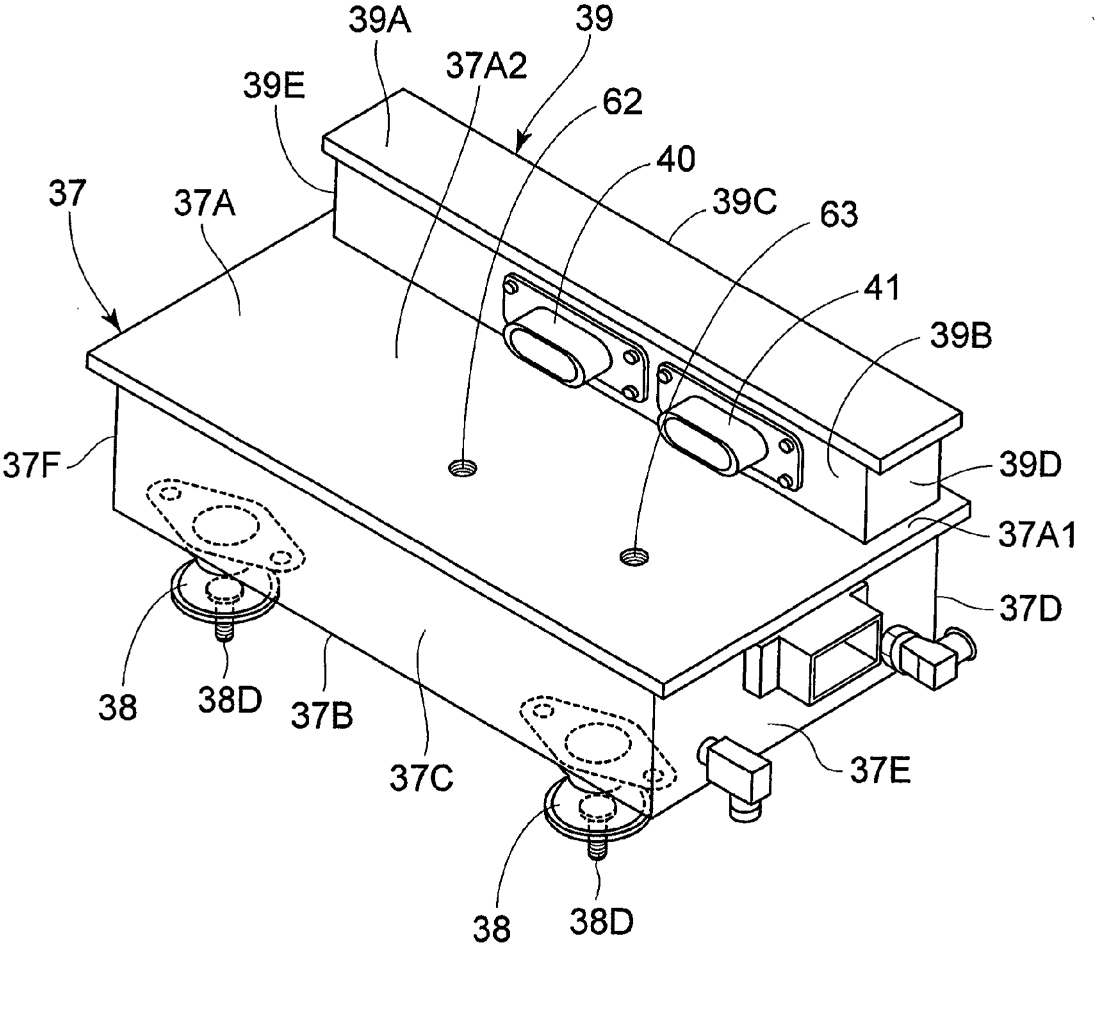
FIG. 15 is a perspective view showing first electrical equipment according to a second modification in the present invention.

However, the present invention is not limited thereto, and the present invention may be configured such that, for example, as a second modification as shown in FIG. 15, bolt holes (female screw holes) 62 and 63 are formed as the clamp fixing portions, and the clamp member is fixed by using a bolt threaded into each of these bolt holes 62 and 63.

Further, the aforementioned embodiment is explained by taking the electric motor 33 that is used in the hybrid type revolving device 30 as an example of the electric device mounted on the vehicle body. However, the present invention is not limited thereto, and the present invention may be applied to an electric hydraulic pump that is used as a prime mover, for example. Further, the present invention may be applied to a hybrid type prime mover for combining the engine 13 and the electric motor for hydraulic pump to drive the hydraulic pump.

DESCRIPTION OF REFERENCE NUMERALS

1: Hydraulic excavator (Construction machine)
2: Lower traveling structure (Vehicle body)
3: Upper revolving structure (Vehicle body)
5: Revolving frame
5A: Position of a utility room (Accommodation room)
13: Engine (Prime mover)
19: Cab
22: Housing cover
26: Left front door (Door cover)
28: Machine room
29: Utility room (Accommodation room)
33: Electric motor (Electric device)
34: Onboard equipment assembly
35: Floor plate

35G: Bolt (Fastening member)
36: First electrical equipment
37, 43: Box
37A, 39A, 43A, 44A: Top surface
37B: Bottom surface
37C, 39B, 43B, 44B: Front surface
37D, 39C, 44C: Rear surface
37E, 39D, 43C, 44D: Left surface
37F, 39E: Right surface
37A1, 43A1: Mounting portion
37A2, 43A2: Remaining portion
38: Vibration absorption mount (Vibration absorption member)
38A: Equipment-side mounting portion
38B: Floor plate-side mounting portion
38C: Elastic body
38D: Bolt
38E: Rotation restricting projection (Rotation restricting member)
39, 44: Connector mounting member
40: First equipment-side connector
41: Second equipment-side connector
42: Second electrical equipment
45: Third equipment-side connector
46: First cable
46A, 47A, 47B: Cable-side connector
47: Second cable
48: First mounting seat (Clamp fixing portion)
49: Second mounting seat (Clamp fixing portion)
50: First clamp member
51: Second clamp member
52: Third clamp member
53, 61: Cover
54: Hanging bolt (Rope hanging tool)
55: Rope
62, 63: Bolt hole (Clamp fixing portion)

The invention claimed is:

1. A construction machine comprising:
an automotive vehicle body;
an electric device that is mounted on said vehicle body;
first electrical equipment that includes at least a first electrical component which is connected to said electric device, and which is supported in a first box on said vehicle body by using a vibration absorption member;
second electrical equipment, that includes at least a second electrical component which is connected to said first electrical component, and which is supported in a second box on said vehicle body;
a first cable that establishes a first connection between said electric device and said first electrical equipment, and a second cable that establishes a second connection between said first electrical equipment and said second electrical equipment, characterized in that:
a first connector mounting member is provided on said first box of said first electrical equipment to be positioned on an outer surface side thereof and to project in an outer space smaller than said first box,
a second connector mounting member is provided on said second box of said second electrical equipment to be positioned on an outer surface side thereof and to project in an outer space smaller than said second box,
a first equipment-side connector to which a first cable-side connector that is provided on a first end portion of said first cable, at a side of said first electrical equipment, is connected, is provided in said first connector mounting member,
a second equipment-side connector, to which a second cable-side connector, that is provided on a first end portion of said second cable, at the side of said first electrical equipment, is connected, is provided in said first connector mounting member,
a third equipment-side connector, to which a third cable-side connector, which is provided on a second end portion of said second cable, at a side of said second electrical equipment, is connected, is provided in said second connector mounting member,
a first clamp member is provided on an outer surface of said first box in said first electrical equipment to be positioned near said first connector mounting member for fixing the first end portion of said first cable at the side of said first electrical equipment,
a second clamp member is provided on the outer surface of said first box in said first electrical equipment to be positioned near said first connector mounting member for fixing the first end portion of said second cable at the side of said first electrical equipment, and
a third clamp member is provided on the output surface of said second box in said second electrical equipment to be positioned near said second connector mounting member for fixing the second end portion of said second cable at the side of said second electrical equipment.

2. The construction machine according to claim 1, wherein
each said first and second box of said respective first and second electrical equipment is formed of a three-dimensional structure that is surrounded by a top surface, a bottom surface, and side surfaces,
each said first and second box of said respective first and second electrical equipment is provided on said vehicle body in a state of directing the bottom surface downward,
each said first and second connector mounting member is mounted to any of outer surfaces other than said bottom surface of each said respective first and second box,
each said cable-side connector of said respective first and second cable is arranged in a remaining portion of each said respective first and second box, other than a portion on which said respective first and second connector mounting member is mounted, among any of said outer surfaces of each said respective first and second box on which said connector mounting member is mounted, and
each said clamp member is mounted in said remaining portion of each said respective first and second box among any of said outer surfaces on which said respective first and second connector mounting member is mounted.

3. The construction machine according to claim 1, wherein
each said first and second box of said respective first and second electrical equipment is formed of a three-dimensional structure that is surrounded by a top surface, a bottom surface, a front surface, a rear surface, a left surface, and a right surface,
each said first and second connector mounting member is formed of a three-dimensional structure that is surrounded by a top surface, a front surface, a rear surface, a left surface, and a right surface,
each said first and second box of said respective first and second electrical equipment is provided on said vehicle body in a state of directing the bottom surface downward, each said first and second connector mounting member is provided on any of said outer surfaces other than said bottom surface of each said first and second box, each said first, second and third equipment-side connector is provided on a surface perpendicular to any of said outer surface on which said respective first and second connector mounting member is provided to said respective first and second box among the respective surfaces of said respective first and second connector mounting member, each said respective first and second connector mounting member is arranged to be closer to said rear surface side of said respective first and second box in such a manner that a space is formed in a front side of said surface on which said respective first, second and third equipment-side connector is provided to said respective first and second connector mounting member, said respective first, second and third cable-side connector of said respective first and second cable is arranged on any of said outer surface of said respective first and second box to be positioned on a front side of said surface on which said respective first, second and third equipment-side connector is provided to said respective first and second connector mounting member, and said respective first, second and third clamp member is arranged on any of said outer surface of said respective first and second box to be positioned on the front side of said surface on which said respective first, second and third equipment-side connector is provided to said respective first and second connector mounting member.

4. The construction machine according to claim 2, wherein first and second clamp fixing portions are provided on said first box, and said first and second clamp members are mounted to said first and second clamp fixing portions, respectively.

5. The construction machine according to claim 1, wherein each said first and second box is provided with a cover for covering said respective first, second and third equipment-side connector that is provided in said respective first and second connector mounting member and said respective first, second and third cable-side connector that is connected to said respective first, second and third equipment-side connector.

6. The construction machine according to claim 1, wherein said first electrical equipment is connected to said electric device by using said first cable, and said second electrical equipment is connected to said first electrical equipment by using said second cable, and wherein an inverter circuit is accommodated in said first box of said first electrical equipment, and a condenser for reserving electrical energy is accommodated in said second box of said second electrical equipment.

7. The construction machine according to claim 1, wherein said vehicle body is provided with a frame for forming a support structure, a cab for defining an operator's room that is provided in a front portion side of said frame, a machine room that is provided in a rear portion side of said frame to accommodate a prime mover required for driving said vehicle body and to be covered with a housing cover, and an accommodation space, that is provided in said housing cover together with said machine room, is closed by a floor plate and can accommodate one of equipment and components, and said floor plate of said accommodation space is removable from said frame, said floor plate and said first electrical equipment are assembled in advance through said vibration absorption member to form a single onboard equipment assembly, and said floor plate forming said single onboard equipment assembly is mounted to said frame in a position of said accommodation space.

8. The construction machine according to claim 7, wherein said accommodation space is formed as a utility room that is provided in a rear portion of said cab, is covered with a door cover which can open and close at a side portion, and is closed by said floor plate.

9. The construction machine according to claim 7, wherein said vibration absorption member is composed of an equipment-side mounting portion that is mounted to said first electrical equipment, a floor plate-side mounting portion that is mounted to said floor plate, an elastic body that is provided between said equipment-side mounting portion and said floor plate-side mounting portion, and a bolt that is provided in said floor plate-side mounting portion to be inserted into said floor plate, and said single onboard equipment assembly is formed by mounting said equipment-side mounting portion of said vibration absorption member to a bottom surface of said first electrical equipment, and fastening said bolt of said vibration absorption member to said floor plate, and said floor plate of said single onboard equipment assembly is mounted to said frame by using a fastening member in a state of being placed on said frame.

10. The construction machine according to claim 9, wherein said floor plate-side mounting portion of said vibration absorption member is provided with a rotation restricting member for suppressing said vibration absorption member to rotate to said floor plate by an engagement to said floor plate.

11. The construction machine according to claim 7, wherein a rope hanging tool is mounted to said floor plate of said single onboard equipment assembly to hang a rope for lifting said single onboard equipment assembly.

* * * * *